US012695096B2

(12) United States Patent
Aotani et al.

(10) Patent No.: US 12,695,096 B2
(45) Date of Patent: Jul. 28, 2026

(54) CONDUCTIVE MATERIAL DISPERSION, COATING AND SECONDARY BATTERY

(71) Applicants: artience Co., Ltd., Tokyo (JP); TOYOCOLOR CO., LTD., Tokyo (JP)

(72) Inventors: Yu Aotani, Tokyo (JP); Yu Morita, Tokyo (JP); Tetsuro Izumiya, Tokyo (JP); Yuta Suzuki, Tokyo (JP); Takahiro Ishii, Tokyo (JP)

(73) Assignees: artience Co., Ltd., Tokyo (JP); TOYOCOLOR CO., LTD., Tokyo (JP)

( * ) Notice: Subject to any disclaimer, the term of this patent is extended or adjusted under 35 U.S.C. 154(b) by 543 days.

(21) Appl. No.: 18/266,806

(22) PCT Filed: Dec. 10, 2021

(86) PCT No.: PCT/JP2021/045612

§ 371 (c)(1),
(2) Date: Jun. 12, 2023

(87) PCT Pub. No.: WO2022/131164

PCT Pub. Date: Jun. 23, 2022

(65) Prior Publication Data

US 2024/0063396 A1 Feb. 22, 2024

(30) Foreign Application Priority Data

Dec. 14, 2020 (JP) ................................ 2020-206803
Aug. 19, 2021 (JP) ................................ 2021-133770

(51) Int. Cl.
*H01M 4/62* (2006.01)

(52) U.S. Cl.
CPC ........... *H01M 4/625* (2013.01); *H01M 4/622* (2013.01)

(58) Field of Classification Search
None
See application file for complete search history.

(56) References Cited

U.S. PATENT DOCUMENTS

| | | | |
|---|---|---|---|
| 10,822,498 | B2 | 11/2020 | Kwon et al. |
| 2010/0047690 | A1 | 2/2010 | Tsuchiya et al. |
| 2014/0151609 | A1 | 6/2014 | Oguro |
| 2015/0044559 | A1 | 2/2015 | Toyoda |
| 2016/0020466 | A1 | 1/2016 | Ulbrich et al. |
| 2022/0204857 | A1 | 6/2022 | Suzuki et al. |

FOREIGN PATENT DOCUMENTS

| | | |
|---|---|---|
| JP | 862221433 | 9/1987 |
| JP | 2000191729 | 7/2000 |
| JP | 2013206759 | 10/2013 |
| JP | 2014132564 | 7/2014 |
| JP | 2014146600 | 8/2014 |
| JP | 2014203555 | 10/2014 |
| JP | 2015187960 | 10/2015 |
| JP | 2016514080 | 5/2016 |
| JP | 2018534382 | 11/2018 |
| JP | 2019110056 | 7/2019 |
| JP | 6638846 | 1/2020 |
| JP | 6743954 | 8/2020 |
| JP | 2020163362 | 10/2020 |
| JP | 2020181655 | 11/2020 |
| JP | 2020189770 | 11/2020 |
| WO | 2013146548 | 10/2013 |
| WO | 2018180812 | 10/2018 |
| WO | 2020203714 | 10/2020 |

OTHER PUBLICATIONS

English Translation of the International Preliminary Report on Patentability Chapter I from PCT/JP2021/045612 (Year: 2022).*
"Office Action of Europe Counterpart Application", issued on Oct. 22, 2024, pp. 1-10.
"International Search Report (Form PCT/ISA/210) of PCT/JP2021/045612", mailed on Mar. 1, 2022, with English translation thereof, pp. 1-6.
"Notice of Reasons for Refusal of Japan Counterpart Application", dated on Sep. 28, 2022, with English translation thereof, p. 1-p. 8.
"Notice of Reasons for Refusal of Japan Counterpart Application", dated on Oct. 28, 2022, with English translation thereof, p. 1-p. 8.
"Notice of Reasons for Refusal of Japan Counterpart Application", issued on Nov. 16, 2021, with English translation thereof, p. 1-p. 6.
"Decision of Refusal of Japan Counterpart Application", issued on Mar. 1, 2022, with English translation thereof, p. 1-p. 12.
"Office Action of Europe Counterpart Application", issued on Mar. 14, 2025, pp. 1-3.
Ma Xian-Guo et al., "Synthesis and Electrochemical Performance of Flexible Polymer Electrolyte", Fine Chemicals, Jul. 2018, submit with English abstract, pp. 1208-1215.
"Office Action of China Counterpart Application", issued on Jun. 27, 2025, with English translation thereof, pp. 1-18.

* cited by examiner

*Primary Examiner* — Colin W. Slifka
(74) *Attorney, Agent, or Firm* — JCIPRNET

(57) ABSTRACT

A conductive material dispersion containing a dispersant that satisfies the following (1) and (2), a carbon-based conductive material (C), and a medium (D) containing at least water. (1) Contains a polymer (A) having one or more selected from the group consisting of nitrile group-containing structural units, carboxyl group-containing structural units, hydroxyl group-containing structural units, and heterocycle-containing structural units and having a weight average molecular weight of 5,000 or more and 360,000 or less. (2) Contains a component (B) other than a polymer and derived from the raw materials of the polymer (A); and the content of the component (B) is 2 mass % or less based on the total mass of the dispersant.

8 Claims, No Drawings

CONDUCTIVE MATERIAL DISPERSION, COATING AND SECONDARY BATTERY

CROSS-REFERENCE TO RELATED APPLICATION

This application is a 371 application of the international PCT application serial no. PCT/JP2021/045612, filed on Dec. 10, 2021, which claims the priority benefit of Japan application no. 2020-206803, filed on Dec. 14, 2020 and Japan application no. 2021-133770, filed on Aug. 19, 2021. The entirety of each of the above-mentioned patent applications is hereby incorporated by reference herein and made a part of this specification.

TECHNICAL FIELD

Embodiments of the present invention relate to a conductive material dispersion, a coating formed using the same, and a secondary battery.

BACKGROUND ART

In recent years, conductive materials have been actively developed to impart functions such as antistatic properties, conductivity, thermal conductivity and electromagnetic wave shielding properties to various materials and apply them to various applications. As conductive materials, carbon-based conductive materials are widely used because of their high heat resistance, light resistance, corrosion resistance, light weight, relatively low cost, and high conductivity.

In order to impart functions using a conductive material, a method of kneading a conductive material into a substrate such as plastic or glass can be used. However, due to its high processability, the mainstream method is to disperse a conductive material in a wet manner, mix it with various materials as necessary, and apply it. In addition, in order not to deteriorate other application properties such as optical properties, design properties, and electrical properties, a conductive material is required to be present in a small amount and exhibit high conductivity. Therefore, it is effective to use a carbon-based conductive material having a large specific surface area, particularly, carbon black (hereinafter referred to as CB) or a carbon nanotube (hereinafter referred to as CNT).

However, since a carbon-based conductive material having a large specific surface area has a strong cohesive force and very low hydrophilicity, particularly, in a medium containing water, there is a problem that it is difficult to disperse it favorably.

Based on this background, various dispersants for conductive materials have been studied. For example, regarding dispersion of CB and CNT, Patent Literature 1 and Patent Literature 2 each propose a conductive material dispersion in which a dispersant is dispersed in an aqueous medium. In Patent Literature 1, polyvinylpyrrolidone or polyvinyl alcohol is used as a dispersant. In Patent Literature 2, a polymer having polyacrylonitrile as a main framework is used as a dispersant. If an efficient conductive network can be formed using these dispersants, improvement in initial properties and cycle lifespan can be expected when a conductor dispersion is prepared and used in, for example, a secondary battery.

In addition, generally, it is known that foaming is likely to occur when dispersoids are dispersed in a medium containing water. When foaming occurs, various problems are likely to occur. For example, air bubbles hinder wetting of dispersoids and chargeability and dispersion tend to deteriorate. In addition, the energy of a dispersing machine is consumed to make air bubbles finer and dispersion tends to slow down. Accordingly, as a result, it is not possible to form an efficient conductive network as described above.

In addition, in a dispersing machine type such as a high pressure homogenizer that makes dispersoids finer by pressure, if air bubbles enter, there is a risk of explosion, nozzle clogging, and device damage.

Therefore, in order to address such problems, an anti-foaming agent is often used when a dispersion medium contains water.

On the other hand, Patent Literature 3 discloses that the residue of low-molecular-weight organic compounds having an unsaturated bond, which is generated when acrylonitrile and butadiene polymers are synthesized affects battery properties. Specifically, it was found that, when a polymer containing the residue is used for a negative electrode, the residue dissolves in an electrolytic solution and moves toward a positive electrode, the unsaturated bond causes an oxidation reaction, and thus battery performance deteriorates, and deterioration of battery performance is solved by reducing an amount of the residue of low-molecular-weight organic compounds having an unsaturated bond.

In addition, in Patent Literature 4, it was found that, when a binder composition containing an acrylic polymer is used in an electrode slurry, monomers for forming a polymer by polymerization and oligomers obtained by reacting monomers are adsorbed on an active material, and dispersion stability decreases, and a method of reducing deterioration of battery performance by reducing the amount of monomers and oligomers is proposed. Here, an acrylic polymer that is dispersed in a medium with an emulsifier is used.

CITATION LIST

Patent Literature

[Patent Literature 1]
Published Japanese Translation No. 2016-514080 of the PCT International Publication
[Patent Literature 2]
Japanese Patent No. 6743954
[Patent Literature 3]
PCT International Publication No. WO2013/146548
[Patent Literature 1]
Japanese Unexamined Patent Application Publication No. 2014/146600

SUMMARY OF INVENTION

Technical Problem

However, even if the dispersants described in Patent Literature 1 and 2 are used, the battery output and the cycle lifespan may be insufficient. After extensive studies of the cause, it was found that the components derived from the raw materials of these dispersants (polymer) cause significant foaming and reduces dispersion. Particularly, it was found that, when a dispersant containing a certain amount or more of components derived from the raw materials of the dispersant (polymer) is dissolved in a dispersion medium, and a conductive material is added while stirring, foaming becomes very significant because air is mixed in with the conductive material.

In addition, it was found that either of phenomena in which components derived from raw materials of the dispersant (polymer) are dissolved in an electrolytic solution in the battery, increase the viscosity of the electrolytic solution and increase diffusion resistance of electrolyte ions, and decrease the dielectric constant of an electrolytic solution solvent and decrease the conductivity of the electrolytic solution is caused or both are caused at the same time, the ion resistance deteriorates, and as a result, various properties of the battery deteriorate.

According to detailed studies performed by the inventors, it was found that the output of a battery with poor ion resistance is significantly poor because the ion resistance becomes dominant particularly at low temperatures. In addition, it was found that, when an antifoaming agent is added in order to solve poor dispersion due to foaming, the antifoaming agent is also dissolved in an electrolytic solution, and battery properties deteriorate for the same reason. In addition, it was found that, even if a polymer that is emulsified using an emulsifier, a surfactant or the like is used, since the emulsifier and the surfactant are dissolved in an electrolytic solution, battery properties deteriorate for the same reason.

Here, the component derived from the raw material of the dispersant described above has a structure having relatively high oxidation resistance. Therefore, the technical idea is different from that of a method of reducing deterioration of battery performance by reducing an amount of the residue (that is, a component having low oxidation resistance) of the low-molecular-weight organic compound having an unsaturated bond as described in Patent Literature 3.

Therefore, one embodiment of the present invention provides a conductive material dispersion with little foaming. In addition, one embodiment of the present invention provides a secondary battery having low electron resistance and ion resistance and a favorable low temperature property.

Solution to Problem

The inventors conducted further studies in order to solve the above problems. As a result, it is possible to provide a secondary battery in which, when a specific polymer is contained as a dispersant, and additionally, the amount of a component derived from a raw material of the specific polymer is reduced to a certain amount or less, a conductive material can be favorably dispersed without adding an antifoaming agent or with the addition of a very small amount thereof, the electron resistance can be improved, and additionally, a low temperature property can be improved. In addition, it is possible to provide a conductive material dispersion which allows an efficient conductive network that can achieve excellent properties to be formed not only in secondary batteries but also in various applications.

That is, the present invention includes the following embodiments. The embodiments of the present invention are not limited to the following.

One embodiment of the present invention relates to a conductive material dispersion containing a dispersant that includes the following (1) and (2), a carbon-based conductive material (C), and a medium containing at least water (D).

(1) A polymer (A) containing one or more selected from the group consisting of nitrile group-containing structural units, carboxyl group-containing structural units, hydroxyl group-containing structural units, and heterocycle-containing structural units and having a weight average molecular weight of 5,000 or more and 360,000 or less (2) a component (B) other than a polymer and derived from a raw material of the polymer (A), and the content of the component (B) based on a mass of the dispersant being 2 mass % or less.

In the conductive material dispersion according to the above embodiment, the polymer (A) may include 5 mass % or less of a polymer (E) having a molecular weight of less than 1,000 based on the total mass of the polymer (A).

In the conductive material dispersion, a complex elastic modulus at 25° C. and 1 Hz obtained by dynamic viscoelasticity measurement is preferably 5 Pa or more and less than 650 Pa.

In the conductive material dispersion, a phase angle at 25° C. and 1 Hz obtained by dynamic viscoelasticity measurement is preferably 3° or more and less than 60°.

Preferably, the conductive material dispersion further contains a binder.

Preferably, the conductive material dispersion further contains an electrode active material.

One embodiment relates to a coating formed using the conductive material dispersion according to the above embodiment.

One embodiment relates to a secondary battery containing the coating according to the above embodiment.

Priority is claimed on Japanese Patent Application No. 2020-206803, filed Dec. 14, 2020, and Japanese Patent Application No. 2021-133770, filed Aug. 19, 2021 the content of which is incorporated herein by reference.

Advantageous Effects of Invention

According to the embodiment of the present invention, it is possible to provide a conductive material dispersion with little foaming. In addition, it is possible to provide a secondary battery having a favorable rate property and cycle property, low electron resistance and ion resistance, and a favorable low temperature property.

DESCRIPTION OF EMBODIMENTS

Hereinafter, as embodiments of the present invention, a dispersant composition containing a polymer (A) and a component (B) other than a polymer and derived from a raw material of the polymer (A) will be described. In addition, a conductive material dispersion containing the dispersant composition, a carbon-based conductive material (C), and a medium (D), and a coating formed using the same and a secondary battery and the like will be described in detail. The present invention is not limited to the following embodiments, and the present invention also includes embodiments that are performed without changing the gist of the present invention.

In this specification, a composition containing the polymer (A) and the component (B) of the present invention may be referred to as a "dispersant composition" or simply referred to as a "dispersant." In this specification, the coating of the present invention may be referred to as an "electrode film."

<Polymer (A)>

The polymer (A) includes one or more selected from the group consisting of nitrile group-containing structural units, carboxyl group-containing structural units, hydroxyl group-containing structural units, and heterocycle-containing structural units. The weight average molecular weight of the polymer (A) is 5,000 or more and 360,000 or less.

The polymer (A) preferably includes an alkylene structure in the main chain. When it has any one structure selected from the group consisting of nitrile groups, carboxyl groups, hydroxyl groups, and heterocycles in the molecule, it has strong polarizability. Therefore, the adsorption to a carbon-based conductive material and the affinity to the medium are improved, and the carbon-based conductive material can be stably present in the medium.

In one embodiment, the polymer (A) preferably includes two or more selected from the group consisting of nitrile group-containing structural units, carboxyl group-containing structural units, hydroxyl group-containing structural units, and heterocycle-containing structural units. When the polymer (A) includes two or more structural units, this is more preferable because the adsorption to the carbon-based conductive material and the affinity to the medium are improved.

The weight average molecular weight of the polymer (A) is the weight average molecular weight in terms of polystyrene and preferably 5,000 or more, more preferably 6,000 or more, and still more preferably 8,000 or more. The weight average molecular weight is preferably 360,000 or less, more preferably 260,000 or less, and still more preferably 100,000 or less. When the polymer has an appropriate weight average molecular weight, the adsorption to a substance to be dispersed is improved, and the stability of the dispersion is further improved.

The nitrile group-containing structural unit is a structural unit containing a nitrile group, and is preferably a structural unit including an alkylene structure substituted with a nitrile group-containing substituent. The alkylene structure is preferably a linear or branched alkylene structure. The number of nitrile groups included in the nitrile group-containing structural unit is preferably 1 or 2, and more preferably 1.

A method of introducing a nitrile group-containing structural unit into the polymer (A) is not particularly limited. As one embodiment, for example, a method of preparing a polymer by a polymerization reaction of nitrile group-containing monomers can be preferably used.

Examples of nitrile group-containing monomers include acrylonitrile, methacrylonitrile, and fumaronitrile. These may be used alone or two or more thereof may be used in combination. When the nitrile group-containing monomer is acrylonitrile, the copolymer is bent less, and adjacent cyano groups are oriented to form a strongly polarized partial structure. Therefore, the intermolecular force between the polymers or between the polymer and the carbon-based conductive material increases. In consideration of increasing the intermolecular force as described above, availability of raw materials and reactivity, the nitrile group-containing monomer is preferably acrylonitrile.

In order to increase the intermolecular force, the content of the nitrile group-containing structural unit when the mass of the polymer (excluding an initiator and a chain transfer agent) is set to 100 mass % is preferably 30 mass % or more, more preferably 45 mass % or more, and still more preferably 60 mass % or more. On the other hand, the content is preferably 100 mass % or less, more preferably 93 mass % or less, and still more preferably 87 mass % or less.

When the content of the nitrile group-containing structural unit is adjusted to be within the above range, the carbon-based conductive material can be stably present in the medium. In addition, when such a polymer is used in a secondary battery, it is possible to prevent problems such as an increase in the resistance of the electrolytic solution due to dissolution of the dispersant in the electrolytic solution in the battery.

The carboxyl group-containing structural unit is a structural unit containing a carboxyl group, and preferably includes a structural unit including an alkylene structure substituted with a carboxyl group-containing substituent. The alkylene structure is preferably a linear or branched alkylene structure. The number of carboxyl groups included in the carboxyl group-containing structural unit is preferably 1 or 2, and more preferably 1.

A method of introducing a carboxyl group-containing structural unit into the polymer (A) is not particularly limited. Examples thereof include a method of preparing a polymer by a polymerization reaction of carboxyl group-containing monomers and a method of preparing a polymer by a polymerization reaction of monomers containing a functional group other than a carboxyl group and modifying it into a carboxyl group. Particularly, a method of preparing a polymer by a polymerization reaction of carboxyl group-containing monomers can be preferably used.

Examples of carboxyl group-containing monomers include unsaturated fatty acids such as (meth)acrylic acid, crotonic acid, itaconic acid, maleic acid, fumaric acid, and citraconic acid, and carboxyl group-containing (meth)acrylates such as 2-(meth)acryloyloxyethylphthalates, 2-(meth)acryloyloxypropylphthalates, 2-(meth)acryloyloxyethyl hexahydrophthalate, 2-(meth)acryloyloxypropyl hexahydrophthalate, ethylene oxide-modified succinate (meth)acrylate, and β-carboxyethyl (meth)acrylate. In addition, acid anhydride group-containing monomers such as maleic anhydride, itaconic anhydride, and citraconic anhydride, which are multimers of the carboxyl group-containing monomers, and monofunctional alcohol adducts thereof may be exemplified.

"≥C(=O)—O—C(=O)—" (in this specification, referred to as an "acid anhydride group") which is a group having a structure in which two carboxyl groups are dehydrated and condensed also forms a carboxyl group by hydrolysis. Therefore, it is included in the concept of carboxyl groups in this specification. In addition, a carboxyl group-containing monomer may also be obtained by hydrolyzing a carbamoyl group of a polymer obtained by a polymerization reaction of monomers containing a carbamoyl group such as (meth)acrylamide. The carboxyl group-containing monomer is preferably an unsaturated fatty acid, more preferably (meth)acrylic acid, and still more preferably acrylic acid.

In order to have appropriate affinity with a medium (D) to be described below, the content of the carboxyl group-containing structural unit when the mass of the polymer (excluding an initiator and a chain transfer agent) is set to 100 mass % is preferably 40 mass % or more, more preferably 60 mass % or more, and still more preferably 80 mass % or more. On the other hand, the content may be preferably 98 mass % or less. In one embodiment, the content may be 100 mass %.

In one embodiment, when the polymer (A) further includes one or more selected from the group consisting of nitrile group-containing structural units, hydroxyl group-containing structural units, and heterocycle-containing structural units, this is more preferable because the affinity between the carbon-based conductive material and the medium increases.

When one or more selected from the group consisting of nitrile group-containing structural units, hydroxyl group-containing structural units, and heterocycle-containing structural units are further included, the content of the carboxyl group-containing structural unit when the mass of the polymer (excluding an initiator and a chain transfer agent) is set to 100 mass % is preferably 3 mass % or more, more preferably 9 mass % or more, and still more preferably 14 mass % or more. In addition, in order to prevent electrolytic solution resistance and moisture absorption during storage, based on the mass of the polymer (that is, when the mass of the polymer is set to 100 mass %), the content is preferably 47 mass % or less, more preferably 37 mass % or less, and still more preferably 27 mass % or less.

The hydroxyl group-containing structural unit is a structural unit containing a hydroxyl group, and preferably includes a structural unit including an alkylene structure substituted with a hydroxyl group-containing substituent. The alkylene structure is preferably a linear or branched alkylene structure. The number of hydroxyl groups included in the hydroxyl group-containing structural unit is preferably 1 or 2, and more preferably 1.

A method of introducing a hydroxyl group-containing structural unit into the polymer (A) is not particularly limited. Examples thereof include a method of preparing a polymer by a polymerization reaction of hydroxyl group-containing monomers and a method of preparing a polymer by a polymerization reaction of monomers containing a functional group other than a hydroxyl group and modifying it into a hydroxyl group. A reasonable method can be selected in consideration of reactivity and raw material costs.

Examples of hydroxyl group-containing monomers include 2-hydroxyethyl (meth)acrylate, 3-hydroxypropyl (meth)acrylate, 4-hydroxybutyl (meth)acrylate, glycerol mono(meth)acrylate, 4-hydroxyvinylbenzene, 2-hydroxy-3-phenoxypropyl acrylate and caprolactone adducts of these monomers (number of moles added is 1 to 5). The hydroxyl group-containing monomer is preferably hydroxyalkyl (meth)acrylate, more preferably 2-hydroxyethyl (meth)acrylate, and still more preferably 2-hydroxyethyl acrylate.

As the method of preparing a polymer by a polymerization reaction of monomers containing a functional group other than a hydroxyl group and modifying it into a hydroxyl group, for example, a method of saponifying acetyl groups of polyvinyl acetate obtained by polymerizing vinyl acetate with an alkali such as sodium hydroxide to form hydroxyl groups may be exemplified (saponification reaction). When the concentration of sodium hydroxide and the treatment time are changed, it is possible to arbitrarily control the reaction rate of saponification (degree of saponification).

In addition, in order to increase the affinity between the carbon-based conductive material and the medium, at least some hydroxyl groups in the polymer may be reacted with an aldehyde compound and modified into acetal groups and then used (acetalization).

As the aldehyde compound used in an acetalization reaction, for example, compounds such as linear, branched, cyclic saturated, cyclic unsaturated, or aromatic aldehydes having 1 to 15 carbon atoms can be used, but the present invention is not limited thereto. Specific examples thereof include formaldehyde, acetaldehyde, propionylaldehyde, n-butyraldehyde, isobutyraldehyde, tert-butyraldehyde, benzaldehyde, and cyclohexylaldehyde. These aldehyde compounds may be used alone or two or more thereof may be used in combination. In addition, except for formaldehyde, these aldehyde compounds may have one or more hydrogen atoms substituted with a halogen or the like. In consideration of versatility, a compound such as a linear, branched, cyclic saturated, cyclic unsaturated, or aromatic aldehyde having 1 to 10 carbon atoms is preferable, and a linear aldehyde compound having 1 to 4 carbon atoms is more preferable. When the aldehyde compound used and the treatment time are changed, it is possible to arbitrarily control the reaction rate of acetalization (degree of acetalization).

The content of the hydroxyl group-containing structural unit when the mass of the polymer (excluding an initiator and a chain transfer agent) is set to 100 mass % is preferably 80 mass % or more, more preferably 85 mass % or more, and still more preferably 99.8 mass % or less. However, when one or more selected from the group consisting of nitrile group-containing structural units, hydroxyl group-containing structural units, and heterocycle-containing structural units are further included, the content is preferably 5 mass % or more, more preferably 95 mass % or less, and still more preferably 85 mass % or less. When the content is adjusted to be within the above range, it is possible to strengthen polarization and improve the affinity between the carbon-based conductive material and the medium. In addition, it is also preferable in consideration of the resistance to the electrolytic solution.

When one or more selected from the group consisting of nitrile group-containing structural units, hydroxyl group-containing structural units, and heterocycle-containing structural units are further included, this is particularly preferable because polarization becomes stronger. For the same reason as in the content of the hydroxyl group-containing structural unit, the content of the acetal groups is preferably within a preferable range of the content of the hydroxyl group-containing structural unit.

The heterocycle-containing structural unit is a structural unit containing a heterocycle and is more preferably a structural unit including an alkylene structure substituted with a heterocycle-containing substituent. The alkylene structure is preferably a linear or branched alkylene structure. The heterocycle contained in the heterocycle-containing structural unit may be a monocyclic structure or a condensed ring structure, and is preferably a monocyclic structure. In addition, the number of heterocycles contained in the heterocycle-containing structural unit is preferably 1 or 2, and more preferably 1.

A heterocycle contains atoms other than carbon atoms among atoms constituting a ring. For example, a heterocycle contains one, two or more nitrogen atoms, oxygen atoms, and sulfur atoms, and the like. Atoms other than carbon atoms constituting a ring are preferably nitrogen atoms or oxygen atoms, and more preferably nitrogen atoms. When atoms other than carbon atoms are included in atoms constituting a ring, polarization occurs within a heterocycle, and can strongly act on the carbon-based conductive material.

In addition, a method of introducing a heterocycle into the polymer (A) is not particularly limited. For example, a method of preparing a polymer by a polymerization reaction of heterocycle-containing monomers can be used.

As the heterocycle-containing monomer, a N-vinyl cyclic amide structural unit is preferable, and examples thereof include N-vinyl-2-pyrrolidone, N-vinyl-ε-caprolactam, N-vinyl-2-piperidone, N-vinyl-3-morpholinone, N-vinyl-1,3-oxazin-2-one, and N-vinyl-3,5-morpholinedione. Particularly, in order to improve battery properties, N-vinyl-2-pyrrolidone is preferable. Here, these can be used alone or two or more thereof can be used in combination.

In order to strengthen polarization and improve the action on the carbon-based conductive material as described above, the content of the heterocycle-containing structural unit when the mass of the polymer (excluding an initiator and a chain transfer agent) is set to 100 mass % is preferably 70 mass % or more, more preferably 80 mass % or more, still more preferably 90 mass % or more, and particularly preferably 95 mass % or more. In one embodiment, the content may be 100 mass %. However, when one or more selected from the group consisting of nitrile group-containing structural units, carboxyl group-containing structural units, and hydroxyl group-containing structural units are further included, the content of the heterocycle-containing structural unit based on the mass of the polymer (that is, when the mass of the polymer is set to 100 mass %) is preferably 5 mass % or more and more preferably 10 mass % or more. On the other hand, the content is preferably 95 mass % or less and more preferably 85 mass % or less. When one or more selected from the group consisting of nitrile group-containing structural units, carboxyl group-containing structural units, and hydroxyl group-containing structural units are further included, this is more preferable because the polarity can increase and the resistance to the electrolytic solution can be improved.

The polymer (A) may include, as other structural units, one or more structural units selected from the group consisting of active hydrogen group-containing structural units (excluding a carboxyl group and a hydroxyl group), basic group-containing structural units, and ester group-containing structural units. The structural unit is selected and included according to properties of a substrate to which a conductive material dispersion according to one embodiment of the present invention is applied or a material to be mixed such as hydrophilicity, hydrophobicity, acidity, and basicity, and can be easily applied for various applications.

The content of other structural units when the mass of the polymer (excluding an initiator and a chain transfer agent) is set to 100 mass % is preferably 20 mass % or less, more preferably 10 mass % or less, and still more preferably 5 mass % or less as long as the polarization of the polymer (A) is not impaired.

The active hydrogen group-containing structural unit is a structural unit having, for example, a primary amino group, a secondary amino group, a mercapto group or the like, as an active hydrogen group. Here, "primary amino group" refers to —$NH_2$ (amino group), "secondary amino group" refers to a group in which one hydrogen atom on a primary amino group is substituted with an organic residue such as an alkyl group. However, primary amino groups and secondary amino groups in acid amides are not included in active hydrogen groups in this specification.

The basic group-containing structural unit is a structural unit containing a basic group. Examples of basic groups include tertiary amino groups and amide groups. Here, a structural unit having a primary amino group and a structural unit having a secondary amino group are also included in basic group-containing structural units. However, in the present invention, it is treated as the active hydrogen group-containing structural unit, and is not included in the basic group-containing structural unit.

The ester group-containing structural unit is a structural unit having a structure represented by $(R^1)_2C{=}C{-}CO{-}O{-}R^2$. In the above formula, $R^1$ is a hydrogen atom or a methyl group, and at least one thereof is a hydrogen atom. $R^2$ is an optionally substituted alkyl group.

Here, those containing the active hydrogen group or the basic group as a substituent for an alkyl group are treated as the active hydrogen group-containing structural unit or the basic group-containing structural unit, and are not included in the ester group-containing structural unit.

In one embodiment, a combination of structural units included in the polymer (A) is preferably one selected from the group consisting of nitrile group-containing structural units/carboxyl group-containing structural units and nitrile group-containing structural units/carboxyl group-containing structural units/hydroxyl group-containing structural units and nitrile group-containing structural units/heterocycle-containing structural units and hydroxyl group-containing structural units/heterocycle-containing structural units and hydroxyl group-containing structural units/acetyl group-containing structural units and hydroxyl group-containing structural units/acetyl group-containing structural units/acetal group-containing structural units. Among these, the polymer (A) preferably includes a combination of nitrile group-containing structural units/carboxyl group-containing structural units.

A method of producing the polymer (A) is not particularly limited. Examples thereof include a solution polymerization method, a suspension polymerization method, a bulk polymerization method, an emulsification polymerization method, and a precipitation polymerization method. Among these, a solution polymerization method or a precipitation polymerization method is preferable. Examples of polymerization reaction systems include addition polymerizations such as ionic polymerization, free radical polymerization, and living radical polymerization. Among these, free radical polymerization or living radical polymerization is preferable. In addition, examples of radical polymerization initiators include peroxides and azo-based initiators.

As the polymerization initiator, for example, the following may be exemplified when radical polymerization is performed, but the present invention is not limited thereto.

Organic peroxides such as di-t-butyl peroxide, lauroyl peroxide, stearyl peroxide, benzoyl peroxide, t-butyl peroxyneodecanate, t-butyl peroxypivalate, dilauroyl peroxide, dicumyl peroxide, t-butyl peroxy-2-ethylhexanoate, 1,1-bis(t-butylperoxy)-3,3,5-trimethylcyclohexane, and 1,1-bis(t-butylperoxy)cyclohexane, and azo-based general radical polymerization initiators such as azobisisobutyronitrile, azobisisovaleronitrile, 1,1-azobis(1-cyclohexanecarbonitrile), 2,2'-azobis-4-methoxy-2,4-azobis isobutyronitrile, 2,2'-azobis-2,4-dimethylvaleronitrile, and 2,2'-azobis-2-methyl butyronitrile.

These may be used alone or two or more thereof may be used in combination. A combination of these radical polymerization initiators and an appropriate reducing agent may be used as a redox-based initiator.

The amount of these polymerization initiators added based on the total mass of all monomers used (that is, when the total mass of all monomers is set to 100 mass %) is generally 1 mass % or less. The amount of the polymerization initiator added can be appropriately selected in consideration of the temperature at which polymerization is performed, and the half-life period of the polymerization initiator.

In the process of producing the polymer (A), it is possible to control the molecular weight of the polymer to be produced using a chain transfer agent or the like as long as the objective of the present invention is not impaired. Examples of chain transfer agents include alkyl mercaptans such as octyl mercaptan, nonyl mercaptan, decyl mercaptan, dodecyl mercaptan, and 3-mercapto-1,2-propanediol, thioglycolic acid esters such as octyl thioglycolate, nonyl thioglycolate, and 2-ethylhexyl thioglycolate, and 2,4-diphenyl-4-methyl-1-pentene, 1-methyl-4-isopropylidene-1-cyclohexene, α-pinene, and β-pinene.

In consideration of handling properties and stability, particularly, 3-mercapto-1,2-propanediol, thioglycolic acid esters, 2,4-diphenyl-4-methyl-1-pentene, 1-methyl-4-isopropylidene-1-cyclohexene, α-pinene, β-pinene and the like are preferable. When the above compound is used, this is preferable because the obtained polymer has a low odor. In one embodiment, as the chain transfer agent, preferably, the above compounds are used alone or two or more thereof are used in combination.

A chain transfer agent can be appropriately added according to the required molecular weight. Generally, based on the total mass of all monomers used (that is, when the total mass of all monomers is set to 100 mass %), the chain transfer agent is preferably used in a range of 0.001 mass % to 4 mass %. In one embodiment, the amount of the chain transfer agent added is preferably 0.01 to 4 mass % and more preferably 0.1 to 2 mass %. When the chain transfer agent is set to be within the above range, the molecular weight of the polymer (A) used as the dispersant in the embodiment of the present invention can be easily adjusted to be within a suitable range.

In addition, examples of other molecular weight control methods include a method of changing a polymerization method, a method of adjusting the amount of a polymerization initiator, and a method of changing a polymerization temperature. One of these molecular weight control methods may be used alone or two or more thereof may be used in combination.

In the conductive material dispersion, the polymer (A) can function as a dispersant. In such a regard, the content of the polymer (A) in the conductive material dispersion is preferably determined according to the specific surface area and ease of wetting of the conductive material. In one embodiment, based on the mass of the conductive material (that is, when the mass of the conductive material is set to 100 mass %), the content of the polymer (A) is preferably 2 mass % or more, more preferably 20 mass % or more, and still more preferably 30 mass % or more. On the other hand, the content is preferably 250 mass % or less, more preferably 150 mass % or less, and still more preferably 100 mass % or less.

<Polymer (E)>

The polymer (E) is a polymer component having a molecular weight of less than 1,000 included in the polymer (A). In order to minimize foaming and make defoaming and antifoaming easier, the content of the polymer (E) based on the total mass of the polymer (A) (that is, when the mass of the polymer (A) is set to 100 mass %) is preferably 5 mass % or less, more preferably 4 mass % or less, and still more preferably 3 mass % or less. When the content of the polymer (E) in the polymer (A) is adjusted to be within the above range, it is possible to easily prevent problems such as an increase in the viscosity of the electrolytic solution due to dissolution of the polymer (E) in the electrolytic solution and a decrease in the dielectric constant of the electrolytic solution solvent.

The content of the polymer (E) can be measured through general gel permeation chromatography (GPC). More specifically, for example, the content can be measured according to the method described in examples.

As a method of adjusting the content of the polymer (E) in the polymer (A) based on the total mass of the polymer (A) to 5 mass % or less, there are a method of optimizing conditions during production and a method of purifying a polymer. Examples thereof include (1) a method of improving the polymerization reaction rate of monomers by optimizing the polymerization temperature and the polymerization time, (2) a method of reducing the amount of by-products of low-molecular-weight components by optimizing the amount of initiators and chain transfer agents, (3) a reprecipitation method in which a solution containing a polymer (A) and a polymer (E) is added dropwise to a poor solvent and precipitated and the polymer (E), which is a low-molecular-weight component, is removed, and (4) a precipitation polymerization method in which production and purification are performed at the same time.

Although it differs depending on the composition of the polymer, a reprecipitation method or a precipitation polymerization method is preferable because it makes it easy to control the amount of the polymer (E). In addition, in consideration of simplicity, a precipitation polymerization method is most preferable.

As described above, in the process of synthesizing the polymer (A), in addition to the polymer having a desired molecular weight, a polymer having a molecular weight such as the polymer (E) may occur. Since it is difficult to completely separate only the polymer (E) from the polymer component, the polymer (A) may include the polymer (E). In addition, the product obtained when the polymer (A) is synthesized may include a component other than the polymer component and derived from the raw material, which will be described below as a component (B).

Therefore, in one embodiment of the present invention, the unpurified product obtained in the process of synthesizing the polymer (A) can be used as a dispersant. For example, the product obtained in the process of synthesizing the polymer (A) includes a desired polymer (A) and a component (B) to be described below. The polymer (A) may include the polymer (E) within a predetermined range. The dispersant (hereinafter may be referred to as a dispersant composition) may contain, as necessary, a component other than the component (B). However, it is preferable not to contain an emulsifier and/or a surfactant. The emulsifier or surfactant is likely to be dissolved in an electrolytic solution, and there is a concern of electrolytic solution resistance deteriorating.

<Component (B)>

The component (B) is a component other than the polymer and derived from the raw material of the polymer (A). The component (B) may contain one or more selected from the group consisting of unreacted raw materials and by-products generated in the above polymerization reaction or the above modification reaction.

Examples of unreacted raw materials include nitrile group-containing monomers as exemplified for the above polymer (A), carboxyl group-containing monomers, monomers that can form a carboxyl group by modification (for example, acrylamide, etc.), hydroxyl group-containing monomers, monomers that can form a hydroxyl group by modification (for example, vinyl acetate, etc.), aldehydes, heterocycle-containing monomers, polymerization initiators, and chain transfer agents.

Examples of by-products generated in the above polymerization reaction or modification reaction include metal salts such as sodium salts, potassium salts, and lithium salts of the unreacted raw materials, organic salts such as ammonium salts and amine salts, acetic acid, sodium acetate, compounds formed by inactivation of a polymerization initiator without polymerization and compounds formed by inactivation of a chain transfer agent without polymerization.

Since the component (B) has a highly polar structure with strong ions or polarization, it can cause foaming in a medium containing water. In addition, if the component (B) remains in the electrode film, it may dissolve in the electrolytic solution and reduce the conductivity of the electrolytic solution. In order to reduce foaming and adverse effects on the electrolytic solution, the content of the component (B) based on the mass of the dispersant composition (that is, when the mass of the dispersant composition is set to 100 mass %) is preferably 2 mass % or less. In one embodiment, the content of the component (B) is more preferably 1.9 mass % or less and still more preferably 1.8 mass % or less. In one embodiment, the content of the component (B) is preferably 1.5 mass % or less, more preferably 1 mass % or less, and still more preferably 0.5 mass % or less. In one embodiment, the content of the component (B) is preferably 0.001 mass % or more and more preferably 0.005 mass % or more.

Among these, for the same reason, the content of the polymerization initiator and the compound formed by inactivation of a polymerization initiator without polymerization based on the mass of the dispersant composition (that is, when the mass of the dispersant composition is set to 100 mass %) is more preferably 1 mass % or less and particularly preferably 0.5 mass % or less. In addition, for the same reason, the content of the chain transfer agent and the compound formed by inactivation of a chain transfer agent without polymerization based on the mass of the dispersant composition (that is, when the mass of the dispersant composition is set to 100 mass %) is preferably 1 mass % or less and more preferably 0.5 mass % or less.

The content of the component (B) can be obtained from the sum of the amount of the volatile component of the dispersant composition and the amount of the salt component determined through ion chromatography. In addition, more specifically, the structure and the content can be determined through gas chromatography analysis of the dispersant composition.

The structure and the content of the component (B) determined through gas chromatography are calculated, for example, under the following measurement conditions, but can be appropriately adjusted depending on the type of the compound expected from the raw material and the structure of the polymer.

- analysis device: gas chromatograph (GC-2025, commercially available from Shimadzu Corporation)
- solvent: DMF
- capillary column: DB-5 MS commercially available from GL Sciences Inc.
- column temperature condition: 60° C. Hold 5 minutes, heated to 100° C. (5° C./min, Hold 0 minutes), and heated to 280° C. (20° C./min, Hold 5 minutes)
- carrier gas: helium (35 kPa)
- inlet temperature: 110° C.

As the method of reducing the content of the component (B), there are a method of optimizing conditions during production and a method of purifying a polymer.

Examples of methods of optimizing conditions during production include a method of optimizing a polymerization temperature and a polymerization time when a polymer (A) is produced by radical polymerization in a solution, and improving a polymerization reaction rate of monomers and a method of optimizing an initiator to be selected and reducing the formation of a low-molecular-weight component (B) such as the initiator residue.

Examples of methods of purifying a polymer include a method of removing a low-molecular-weight component (B) in a production step and a method of removing a low-molecular-weight component (B) after production.

Examples of methods of removing a low-molecular-weight component (B) in a production step include a precipitation polymerization method in which a desired product polymer (A) is obtained by filtering, and a low-molecular-weight component (B) can be removed by filtration and washing.

In addition, a method in which a large amount of water or a solvent is added to a polymer (A) solution produced by emulsification polymerization or solution polymerization, and the concentration is adjusted while removing the low-molecular-weight component (B) by distillation may be exemplified.

In addition, examples of methods of removing the low-molecular-weight component (B) after production include a reprecipitation method in which a polymer (A) solution produced in a solution is added dropwise into a poor solvent and precipitated and the low-molecular-weight component (B) is removed by filtration and washing and a method in which the component (B) that could not be removed by the reprecipitation method is removed by drying under a reduced pressure.

Although it differs depending on the polymer composition, a reprecipitation method and a precipitation polymerization method are preferable because it makes it easy to control the amount of the component (B), and a precipitation polymerization method is most preferable in consideration of simplicity.

<Carbon-Based Conductive Material (C)>

The carbon-based conductive material (C) contains at least a carbon-based conductive material, and as necessary, may contain other conductive materials. Examples of carbon-based conductive materials include carbon materials such as carbon black, carbon nanotubes, carbon fibers, and graphite. Among carbon-based conductive materials, carbon black or carbon nanotubes are preferable in consideration of conductivity and density. In addition, when foams are generated during the production process or use of the conductive material dispersion, since carbon nanotubes have a very strong cohesive force and a high aspect ratio, they are particularly preferable because they have an effect of breaking and defoaming a foam film.

One type of carbon-based conductive materials may be used or two or more types thereof may be used in combination. In addition, in order to reduce raw material costs and form an efficient conductive network, two or more types of carbon-based conductive materials of the same type and having different physical properties may be used in combination. Examples of carbon-based conductive materials of the same type and having different physical properties include two types of carbon nanotubes having different average outer diameters or average fiber diameters and two types of carbon black having different specific surface areas.

The specific surface area of the carbon-based conductive material calculated by a BET method is preferably 100 $m^2/g$ or more and more preferably 150 $m^2/g$ or more. On the other hand, the specific surface area is preferably 1,200 $m^2/g$ or less and more preferably 850 $m^2/g$ or less.

Carbon nanotubes may have a shape in which flat graphite is wound in a cylindrical shape and may include single-walled carbon nanotubes and multi-walled carbon nanotubes, or a mixture thereof. In addition, carbon nanotubes having different diameters may be mixed. The single-walled carbon nanotube has a structure in which one graphite layer is wound. The multi-walled carbon nanotube has a structure in which two, three or more graphite layers are wound. In addition, side walls of carbon nanotubes need not have a graphite structure. In addition, for example, carbon nanotubes having side walls having an amorphous structure are also carbon nanotubes in this specification.

The shape of carbon nanotubes is not limited. Examples of such shapes include various shapes including a needle shape, a cylindrical tubular shape, a fishbone shape (a fishbone or cup-laminated type), a tramp shape (platelet) and a coil shape. In the present embodiment, among these, the shape of the carbon nanotube is preferably a needle shape or a cylindrical tubular shape. Carbon nanotubes may be of a single shape or of a combination of two or more shapes.

Examples of forms of carbon nanotubes include graphite whiskers, filamentous carbon, graphite fibers, ultrafine carbon tubes, carbon tubes, carbon fibrils, carbon microtubes and carbon nanofibers. Carbon nanotubes may have one of these forms or a form in which two or more thereof are combined.

When carbon nanotubes are used, the average outer diameter of the carbon nanotubes is preferably 1 nm or more. In addition, the average outer diameter is preferably 30 nm or less, more preferably 20 nm or less, still more preferably 10 nm or less, and particularly preferably 7 nm or less. When the average outer diameter is set to be within the above range, an efficient conductive network can be formed.

Here, the average outer diameter can be calculated as follows. First, a transmission electron microscope is used to observe and image carbon nanotubes. Next, in observation images, 300 arbitrary carbon nanotubes are selected, and the outer diameters thereof are measured. Next, the average outer diameter (nm) of carbon nanotubes is calculated as the number average of the outer diameters.

A value obtained by dividing the average fiber length of carbon nanotubes is by the average outer diameter is called an aspect ratio. In consideration of the defoaming effect, the aspect ratio of the carbon nanotubes is preferably 20 or more, more preferably 50 or more, still more preferably 5,000 or less, and yet more preferably 200 or less.

Here, the average fiber length used for calculating the aspect ratio can be calculated as follows. First, a scanning electron microscope is used to observe and image carbon nanotubes. Next, in observation images, 300 arbitrary carbon nanotubes are selected, and their fiber lengths are measured. Next, the average fiber length of the carbon nanotubes is calculated as the number average of the fiber lengths.

In order to form an efficient conductive network and exhibit the defoaming effect, the average fiber length of carbon nanotubes is preferably 0.3 μm or more, more preferably 0.5 μm or more, still more preferably 5.0 μm or less, and yet more preferably 2.0 μm or less.

Examples of carbon black include acetylene black, furnace black, hollow carbon black, channel black, thermal black, and ketjen black. In addition, carbon black may be neutral, acidic, or basic, and oxidized carbon black or graphitized carbon black may be used. When carbon black is used, acetylene black, which has a high aspect ratio and a high defoaming effect, is more preferable.

As other conductive materials, for example, metal powder of gold, silver, copper, silver-plated copper powder, silver-copper composite powder, silver-copper alloys, amorphous copper, nickel, chromium, palladium, rhodium, ruthenium, indium, silicon, aluminium, tungsten, molbutene, and platinum, inorganic powder coated with these metals, powder of metal oxides such as silver oxide, indium oxide, tin oxide, zinc oxide, and ruthenium oxide, inorganic powder coated with these metals oxide, and the conductive materials may be used alone or two or more thereof may be used in combination.

The content of the carbon-based conductive material based on the non-volatile content of the conductive material dispersion (that is, when the mass of the non-volatile content of the conductive material dispersion is set to 100 mass %) is preferably 0.1 to 25 mass % and more preferably 0.3 to 10 mass %. Within the above range, the conductive material can be favorably and stably present without causing precipitation or gelation. In addition, it is preferable to appropriately adjust the content of the conductive material depending on the specific surface area of the conductive material, the affinity to the dispersion medium and the like so that a conductive material dispersion having an appropriate fluidity or viscosity can be obtained.

<Medium (D)>

The medium (D) contains at least water and may optionally contain other media that have affinity with water.

<Antifoaming Agent>

In one embodiment, the conductive material dispersion may further contain a small amount of an antifoaming agent. The amount of the antifoaming agent added based on the mass of the conductive material dispersion (that is, when the mass of the conductive material dispersion is set to 100 mass %) is preferably 5 mass % or less, more preferably 3 mass % or less, and still more preferably 1 mass % or less. Most preferably, the conductive material dispersion does not contain an antifoaming agent.

As the antifoaming agent, arbitrary agents such as commercially available antifoaming agents, wetting agents, and water-soluble organic solvents can be used as long as they have an antifoaming effect, and one type thereof may be used or a plurality thereof may be used in combination. For example, the following may be exemplified.

Alcohols: ethanol, propanol, isopropanol, butanol, octyl alcohol, hexadecyl alcohol, acetylene alcohol, ethylene glycol monobutyl ether, methyl cellosolve, butyl cellosolve, propylene glycol monomethyl ether, acetylene glycol, polyoxyalkylene glycol, propylene glycol, other glycols, and the like.

Fatty acid esters: diethylene glycol laurate, glycerol monoricinoleate, alkenyl succinic acid derivatives, sorbitol monolaurate, sorbitol trioleate, polyoxyethylene monolaurate, polyoxyethylene sorbitol monolaurate, natural waxes, and the like.

Amides: polyoxyalkyleneamides, acrylate polyamines, and the like.

Phosphate esters: tributyl phosphate, sodium octyl phosphate, and the like.

Metal soaps: aluminum stearate, calcium oleate, and the like.

Oils and fats: animal and vegetable oils, sesame oil, castor oil, and the like.

Mineral oils: kerosene, paraffin, and the like.

Silicones: dimethyl silicone oil, silicone paste, silicone emulsion, organic modified polysiloxane, fluorosilicone oil, and the like.

Water-soluble organic solvents other than alcohols: N-methyl-2-pyrrolidone and the like.

Among these, in order to reduce the influence on diffusion resistance and conductivity of the electrolytic solution, an alcohol or N-methyl-2-pyrrolidone is preferable. In consideration of an antifoaming effect, acetylene glycol is preferable. When the above antifoaming agent is used, it is possible to lower the surface tension of the conductive material dispersion. The surface tension of the conductive material dispersion is preferably 73 mN/m or less, more preferably 70 mN/m or less, and still more preferably 65 mN/m or less in consideration of energy efficiency of the dispersing machine and coatability. The antifoaming agent can be added at any timing from the start to the end of a dispersion process including charging, but in consideration of chargeability and dispersion efficiency, it is preferable to add the antifoaming agent before a substance to be dispersed and a dispersion medium are mixed. In addition, it may be added at once or may be added a plurality of times in a divided manner.

<Conductive Material Dispersion>

The conductive material dispersion according to one embodiment of the present invention contains a polymer (A), a component (B), a carbon-based conductive material (C), and a medium (D). The conductive material dispersion can be suitably used for a secondary battery electrode. However, its application is not limited to secondary batteries, and it can be used for storage devices other than secondary batteries, for example, electric double-layer capacitor electrodes and non-aqueous electrolyte capacitor electrodes, and antistatic materials such as IC trays made of plastic or rubber products and molded components of electronic component materials, electronic components, substitutes for transparent electrodes (ITO film), and electromagnetic wave shields.

The conductive material dispersion according to one embodiment of the present invention may contain additives such as inorganic bases, inorganic metal salts, and organic bases. Since strong polarization of the polymer (A) interacts with the additives, the dispersion stability of the substance to be dispersed over time is further improved. As inorganic bases and inorganic metal salts, compounds having at least one of alkali metals and alkaline earth metals are preferable.

Examples of inorganic bases and inorganic metal salts include chlorides, hydroxides, carbonates, nitrates, sulfates, phosphates, tungstates, vanadates, molybdates, niobates, and borates of alkali metals and alkaline earth metals. Among these, chlorides, hydroxides, carbonates, and alkoxides of alkali metals and alkaline earth metals are preferable because they can easily supply cations.

Examples of hydroxides of alkali metals include lithium hydroxide, sodium hydroxide, and potassium hydroxide.

Examples of hydroxides of alkaline earth metals include calcium hydroxide and magnesium hydroxide.

Examples of carbonates of alkali metals include lithium carbonate, lithium hydrogencarbonate, sodium carbonate, sodium hydrogen carbonate, potassium carbonate, and potassium hydrogen carbonate.

Examples of carbonates of alkaline earth metals include calcium carbonate and magnesium carbonate.

Examples of alkoxides of alkali metals include lithium methoxide, lithium ethoxide, lithium-n-butoxide, lithium-t-butoxide, potassium methoxide, potassium ethoxide, potassium-n-butoxide, potassium-t-butoxide, sodium methoxide, sodium ethoxide, sodium-n-butoxide, and sodium-t-butoxide. The number of carbon atoms of alkoxides may be 5 or more.

Examples of alkoxidea of alkaline earth metals include magnesium methoxide, magnesium ethoxide, magnesium-n-butoxide, and magnesium-t-butoxide. The number of carbon atoms of alkoxides may be 5 or more.

Among these, lithium hydroxide, sodium hydroxide, lithium carbonate, sodium carbonate, lithium-t-butoxide, potassium-t-butoxide, and sodium-t-butoxide are more preferable. Here, the metal contained in the inorganic base and inorganic metal salt of the present invention may be a transition metal.

Examples of organic bases include primary, secondary and tertiary alkylamines having 1 to 40 carbon atoms and an optionally substituted alkyl group, and compounds containing basic nitrogen atoms thereof.

Examples of primary alkylamines having 1 to 40 carbon atoms and an optionally substituted alkyl group include propylamine, butylamine, isobutylamine, octylamine, 2-ethylhexylamine, laurylamine, stearylamine, oleylamine, 2-aminoethanol, 3-aminopropanol, 3-ethoxypropylamine, and 3-lauryloxypropylamine.

Examples of secondary alkylamines having 1 to 40 carbon atoms and an optionally substituted alkyl group include dibutylamine, diisobutylamine, N-methylhexylamine, dioctylamine, distearylamine, and 2-methylaminoethanol.

Examples of tertiary alkylamines having 1 to 40 carbon atoms and an optionally substituted alkyl group include triethylamine, tributylamine, N,N-dimethylbutylamine, N,N-diisopropylethylamine, dimethyloctylamine, tri-n-butylamine, dimethylbenzylamine, trioctylamine, dimethyldecylamine, dimethyllaurylamine, dimethylmyristylamine, dimethylpalmitylamine, dimethylstearylamine, dilaurylmonomethylamine, triethanolamine, and 2-(dimethylamino) ethanol.

Among these, a primary, secondary or tertiary alkylamine having 1 to 30 carbon atoms and an optionally substituted alkyl group is preferable, and a primary, secondary or tertiary alkylamine having 1 to 20 carbon atoms and an optionally substituted alkyl group is more preferable.

An optionally substituted alkyl group means that a hydrogen atom is optionally substituted, and examples of substituents include a hydroxy group.

Examples of other compounds containing basic nitrogen atoms include 1,8-diazabicyclo[5.4.0]undecene-7 (DBU), 1,5-diazabicyclo[4.3.0]nonene-5(DBN), 1,4-diazabicyclo [2.2.2]octane (DABCO), imidazole, and 1-methylimidazole.

A total amount of inorganic bases, inorganic metal salts, and organic bases added based on the mass of the dispersant composition (that is, when the mass of the dispersant composition is set to 100 mass %) is preferably 1 mass % or more, more preferably 100 mass % or less, and still more preferably 50 mass % or less. When an appropriate amount is added, the wettability of the carbon-based conductive material is further improved.

The pH of the conductive material dispersion is preferably 6.0 or more and 11.0 or less, more preferably 7.0 or more and 11.0 or less, and still more preferably 8.0 to 11.0. If the pH is below the above range, the conductive material dispersion tends to gel. If the pH exceeds the above range, problems such as corrosion of various raw materials and exterior materials in the battery or gelation of the binder tend to occur. The pH can be measured with a general pH meter.

The dispersion of the conductive material in the conductive material dispersion can be evaluated by the complex elastic modulus and the phase angle obtained by dynamic viscoelasticity measurement. The complex elastic modulus indicates the hardness of the conductive material dispersion, and tends to decrease as the dispersion of the conductive material becomes favorable and as the viscosity decreases. However, when the fiber length of carbon nanotubes is long or when the structure length of carbon black is long, even if the conductive material is uniformly and stably loosened in the medium, since the conductive material itself has structural viscosity, the complex elastic modulus may be a high numerical value. In one embodiment, the complex elastic modulus of the conductive material dispersion obtained by dynamic viscoelasticity measurement at 25° C. and 1 Hz is preferably 5 Pa or more and more preferably 10 Pa or more, and on the other hand, the complex elastic modulus at 25° C. and 1 Hz is preferably 650 Pa or less, more preferably 400 Pa or less, and still more preferably 100 Pa or less. As one embodiment, the complex elastic modulus of the conductive material dispersion at 25° C. and 1 Hz is preferably 5 Pa or more and 650 Pa or less.

In addition, the phase angle is the phase shift of a stress wave when the strain applied to the conductive material dispersion has a sine wave. In the case of a purely elastic component, since the sine wave has the same phase as the applied strain, the phase angle is 0°. On the other hand, in the case of a purely viscous component, the stress wave advances by 90°. In a general viscoelasticity measurement sample, the sine wave has a phase angle of larger than 0° and smaller than 90°, and if the dispersion of the conductive material in the conductive material dispersion is favorable, the phase angle approaches 90° for a purely viscous component.

However, like the complex elastic modulus, when the conductive material itself has structural viscosity, even if the conductive material is uniformly and stably loosened in the medium, the phase angle may be a low numerical value. In such a regard, in one embodiment, the phase angle of the conductive material dispersion obtained by dynamic viscoelasticity measurement at 25° C. and 1 Hz is preferably 3° or more, more preferably 5° or more, and still more preferably 10° or more. On the other hand, the phase angle at 25° C. and 1 Hz is preferably less than 60° and more preferably less than 50°. As one embodiment, the phase angle of the conductive material dispersion obtained by dynamic viscoelasticity measurement at 25° C. and 1 Hz is preferably 3° or more and less than 60°.

A conductive material with a large fiber length of carbon nanotubes or structure length of carbon black is uniformly and well-dispersed while maintaining a certain length or longer, and a well-developed conductive network is formed. Therefore, it is not enough for simply the viscosity of the conductive material dispersion to be low (apparently) and dispersion to be favorable, and it is important to combine either or both of the complex elastic modulus and the phase angle with conventional indicators such as viscosity and determine the dispersion state. Among these, it is particularly important to give the priority to the phase angle. In such a regard, when the complex elastic modulus and the phase angle are set to be within the above ranges, it is possible to easily obtain a conductive material dispersion having favorable conductivity and electrode strength. The complex elastic modulus and the phase angle of the conductive material dispersion can be measured by the methods described in examples.

The viscosity of the conductive material dispersion of the present embodiment when measured using a rheometer at a shear rate of 1 ($s^{-1}$) is preferably 5 Pa·s or more, more preferably 10 Pa·s or more, and still more preferably 20 Pa·s or more, and is preferably less than 60 Pa·s and more preferably less than 40 Pa·s. In addition, when measured using a rheometer at a shear rate of 10 ($s^{-1}$), the viscosity is preferably 1 Pa·s or more and preferably less than 10 Pa·s. When the viscosity at each shear rate is set to be within the above range, the dispersion particle size and the dispersion state of the conductive material become favorable and the electrode strength and the conductivity can be improved.

The cumulative particle size D10 of the conductive material dispersion of the present embodiment measured by a laser diffraction method is preferably 100 nm or more, more preferably 200 nm or more, and particularly preferably 300 nm or more, and is preferably less than 500 nm and more preferably less than 400 nm. The cumulative particle size D50 of the conductive material dispersion measured by a laser diffraction method is preferably 200 nm or more. On the other hand, the cumulative particle size D50 is preferably less than 3,000 nm, more preferably less than 2,000 nm, and still more preferably less than 1,500 nm.

The particle size measured by a laser diffraction method has a correlation with the length of the conductive material in the dispersion (the fiber length of carbon nanotubes or the structure length of carbon black), and a conductive material dispersion having the cumulative particle sizes D10 and D50 within the above ranges has a favorable dispersion state of the conductive material in the dispersion. In addition, if the particle size is above the above range, the conductive material in an aggregated state is present and if the particle size is below the above range, since a large number of finely cut conductive materials are generated, it becomes difficult to form an efficient conductive network. Particularly, if the cumulative particle size D10 is below the above range, since a large amount of a conductive material that is excessively dispersed due to damage to the conductive material or the like is contained, it becomes difficult to form a well-developed conductive network.

Here, the cumulative particle size D10 and the cumulative particle size D50 can be determined using a general dynamic light scattering type measuring device, and more specifically, can be measured by the method described in examples. In this specification, the cumulative particle size D10 and the cumulative particle size D50 may be simply denoted as "D10" and "D50."

<Dispersion Method>

The conductive material dispersion of the present invention is, for example, preferably produced by finely dispersing a composition (raw material) containing a dispersant, a carbon-based conductive material, and a medium using a dispersing device and performing a dispersion treatment. Here, the dispersion treatment may be performed in multistep treatments including two or more steps by arbitrarily adjusting the addition timing of the material to be used.

As the dispersing device, a dispersing machine that is generally used for pigment dispersion and the like can be used. Examples thereof include kneaders, 2-roll mills, 3-roll mills, planetary mixers, ball mills, horizontal sand mills, vertical sand mills, annular bead mills, attritors, high shear mixers, dispers, and high pressure homogenizers. The pressure when a high pressure homogenizer is used is preferably 60 to 150 MPa and more preferably 60 to 120 MPa.

Dispersing methods using a dispersing device include batch type dispersion, pass-type dispersion, circulation dispersion and the like, and any method may be used and two or more methods may be combined.

Batch type dispersion is a method in which dispersion is performed only by the main body of the dispersing device without using pipes or the like. Since it is easy to handle, this method is preferable when a small amount is produced. Pass-type dispersion is a dispersing method in which the main body of the dispersing device includes a tank that supplies a solution to be dispersed through a pipe and a tank the receives the solution to be dispersed, and the solution is passed through the main body of the dispersing device. In addition, circulation dispersion is a method in which the solution to be dispersed that has passed through the main body of the dispersing device is returned to the tank that supplies the solution to be dispersed and dispersion is performed while circulating.

In any case, since dispersion further progresses as the treatment time is longer, pass or circulation can be repeated until a desired dispersion state is achieved, and the treatment amount can be increased by changing the size of the tank and the treatment time. Pass-type dispersion is preferable to circulation dispersion because it makes it easier to uniformize the dispersion state. Circulation dispersion is preferable to pass-type dispersion because it requires a simpler operation and production facility. In the dispersion process, crushing of aggregated particles, loosening, wetting, and stabilization of the conductive material and the like procced sequentially or simultaneously. Since the finished dispersion state differs depending on the manner in which this is performed, it is preferable to manage the dispersion state in each dispersion process using various evaluation methods. For example, it can be managed by the method described in examples to be described below.

In addition, a method in which preliminary dispersion is performed by applying shear stress to the conductive material composition until the dispersion particle size determined (according to JIS K 5600-2-5) by a grind gauge becomes 200 μm or less and subsequently, main dispersion is then performed to produce a conductive material dispersion is preferable. The main dispersion is preferably performed using a high pressure homogenizer or the like at a pressure of 60 to 150 MPa until D50 becomes 100 μm or less. In this case, if a base is added to adjust the pH of the dispersion medium to 7.0 or more and 13.5 or less, it is possible to improve the wettability of the conductive material and improve the operation of the dispersant.

Examples of dispersion methods of applying shear stress include methods using dispersing devices such as 3-roll mills, planetary mixers, high shear mixers, and dispers. Among these, a high shear mixer that can perform dispersion at a viscosity equivalent to the viscosity suitable for a high pressure homogenizer is preferably used.

The conductive material dispersion according to one embodiment of the present invention may further contain a binder. When the conductive material dispersion is used in a secondary battery, the binder is not particularly limited as long as it is generally used as a binder for secondary batteries, and can be appropriately selected depending on the purpose. In addition, the binder is a resin that can bind substances such as carbon-based conductive materials and other particles, and is different from the polymer (A) and the polymer (E) described in this specification.

Examples of binders used in secondary batteries include polymers or copolymers containing ethylene, propylene, vinyl chloride, vinyl acetate, vinyl alcohol, maleic acid, acrylic acid, acrylic acid ester, methacrylic acid, methacrylate, acrylonitrile, styrene, vinyl butyral, vinyl acetal, vinylpyrrolidone or the like as constituent units;

- polyurethane resin, polyester resin, phenolic resin, epoxy resin, phenoxy resin, urea resin, melamine resin, alkyd resin, acrylic resin, formaldehyde resin, silicone resin, and fluororesin;
- cellulose resin (for example, carboxymethyl cellulose (CMC));
- elastomers such as styrene-butadiene rubber and fluorine rubber; and
- conductive resins such as polyaniline and polyacetylene.

In addition, modified products, mixtures, and copolymers of these resins may be used. Among these, when used as a binder for a positive electrode, in consideration of resistance, polymers or copolymers having fluorine atoms in the molecule, for example, polyvinylidene fluoride, polyvinyl fluoride, tetrafluoroethylene and the like are preferable. In addition, when used as a binder for a negative electrode, carboxymethyl cellulose, styrene butadiene rubber, polyacrylic acid, and the like, which have favorable adhesion, are preferable.

The content of the binder used in a secondary battery based on the mass of the non-volatile content of the conductive material dispersion (that is, when the mass of the non-volatile content of the conductive material dispersion is set to 100 mass %) is preferably 0.5 to 30 mass % and more preferably 0.5 to 25 mass %.

The conductive material dispersion may contain a positive electrode active material or a negative electrode active material. In this specification, the positive electrode active material and the negative electrode active material may be simply referred to as an "active material." The active material is a material that serves as a base for a battery reaction. The active materials are classified into a positive electrode active material and a negative electrode active material according to the electromotive force. In this specification, a conductive material dispersion containing a positive electrode active material or a negative electrode active material may be referred to as a "positive electrode mixture composition," a "negative electrode mixture composition," or simply a "mixture composition."

The mixture composition is preferably in a slurry form in order to improve uniformity and processability. The mixture composition contains at least a conductive material dispersion containing an active material or a conductive material dispersion containing a binder and an active material. In this specification, the mixture composition may be referred to as a "mixture slurry."

<Positive Electrode Active Material>

The positive electrode active material is not particularly limited, and for example, for secondary battery applications, metal compounds such as metal oxides and metal sulfides that can reversibly dope or intercalate lithium ions can be used. Examples thereof include composite oxide powders of lithium and transition metals such as lithium manganese composite oxide (for example, $Li_xMn_2O_4$ or $Li_xMnO_2$), lithium nickel composite oxide (for example, $Li_xNiO_2$), lithium cobalt composite oxide ($Li_xCoO_2$), lithium nickel cobalt composite oxide (for example, $Li_xNi_{1-y}Co_yO_2$), lithium manganese cobalt composite oxide (for example, $Li_xMn_yCo_{1-y}O_2$), lithium nickel manganese cobalt composite oxide (for example, $Li_xNi_yCo_zMn_{1-y-z}O_2$), and spinel type lithium manganese nickel composite oxide (for example, $Li_xMn_{2-y}Ni_yO_4$), lithium phosphate powders having an olivine structure (for example, $Li_xFePO_4$, $Li_xFe_{1-y}Mn_yPO_4$, $Li_xCoPO_4$, etc.), transition metal oxide powders of manganese oxide, iron oxide, copper oxide, nickel oxide, vanadium oxide(for example, $V_2O_5$, $V_6O_{13}$), titanium oxide and the like, and transition metal sulfide powders of iron sulfate ($Fe_2(SO_4)_3$), $TiS_2$, and FeS. However, x, y, and z are numbers, and $0<x<1$, $0<y<1$, $0<z<1$, and $0<y+z<1$.

These positive electrode active materials may be used alone or a plurality thereof may be in combination. Among these, in consideration of water resistance, lithium phosphate powder having an olivine structure is particularly preferable.

<Negative Electrode Active Material>

The negative electrode active material is not particularly limited, and for example, metallic Li that can reversibly dope or intercalate lithium ions, its alloys, tin alloys, silicon alloy negative electrodes, metal oxides such as $Li_XTiO_2$, $Li_XFe_2O_3$, and $Li_XFe_3O_4$, $Li_XWO_2$, conductive polymers such as polyacetylene and poly-p-phenylene, artificial graphite such as a highly graphitized carbon material, carbon powders such as natural graphite, and a resin-burned carbon material can be used. However, X is a number and, $0<X<1$. These negative electrode active materials may be used alone or a plurality thereof may be in combination.

The content of the carbon-based conductive material in the mixture composition based on the mass of the active material (that is, when the mass of the active material is set to 100 mass %) is preferably 0.01 mass % or more, more preferably 0.02 mass % or more, and still more preferably 0.03 mass % or more. In addition, the content is preferably 10 mass % or less, more preferably 7 mass % or less, and still more preferably 5 mass % or less.

The content of the polymer (A) in the mixture composition based on the mass of the active material (that is, when the mass of the active material is set to 100 mass %) is preferably 0.01 mass % or more and more preferably 0.02 mass % or more. In addition, the content is preferably 10 mass % or less and more preferably 5 mass % or less.

When the mixture composition contains a binder, the content of the binder in the mixture composition based on the mass of the active material (that is, when the mass of the active material is set to 100 mass %) and is preferably 0.5 mass % or more. In addition, the content is preferably 30 mass % or less, more preferably 25 mass % or less, and still more preferably 20 mass % or less.

The content of the solid component in the mixture composition based on the mass of the mixture composition (that is, when the mass of the mixture composition is set to 100 mass %) is preferably 30 mass % or more and more preferably 40 mass % or more. In addition, the content is preferably 90 mass % or less and more preferably 80 mass % or less.

The mixture composition can be produced by various conventionally known methods. Examples thereof include a method of mixing a dispersant, a carbon-based conductive material, a medium, a binder, and an active material and performing dispersion for production; a method of dispersing a dispersant, a carbon-based conductive material, and a medium, then adding an active material, and then adding a binder for production; and a method of dispersing a dispersant, a carbon-based conductive material and a medium, then adding a binder and then adding an active material for production.

As the method of producing a mixture composition, a method of dispersing a dispersant, a carbon-based conductive material, a medium, and a component, then adding a binder, and then additionally adding an active material, and performing a dispersion treatment is preferable. A dispersing device used for dispersion is not particularly limited. A mixture composition can be obtained using a dispersion unit exemplified in the description of the conductive material dispersion. Therefore, as the method of producing a mixture composition, a treatment of adding an active material and performing dispersion may be performed without adding a binder to the conductive material dispersion.

<Electrode Film>

When a coating formed using a conductive material dispersion according to one embodiment of the present invention is used in a secondary battery, the coating may be referred to as an "electrode film" in this specification. Therefore, one embodiment of the present invention relates to an electrode film formed using the conductive material dispersion according to the above embodiment. The electrode film may further contain a collector. The electrode film can be obtained, for example, by applying a conductive material dispersion onto a collector and drying it, and includes a collector and a film. An electrode film formed using a positive electrode mixture composition can be used as a positive electrode. An electrode film formed using a negative electrode mixture composition can be used as a negative electrode. In this specification, a film formed using a conductive material dispersion containing an active material may be referred to as an "electrode mixture layer."

The material and shape of the collector used for forming the electrode film are not particularly limited, and those suitable for various secondary batteries can be appropriately selected. Examples of materials of collectors include conductive metals or alloys of aluminum, copper, nickel, titanium, and stainless steel. In addition, as the shape, a flat foil is generally used, but a collector with a roughened surface, a perforated foil collector, and a mesh-like collector can also be used. The thickness of the collector is preferably about 0.5 to 30 μm.

The method of applying a conductive material dispersion onto a collector is not particularly limited, and known methods can be used. Specific examples thereof include a die coating method, a dip coating method, a roll coating method, a doctor coating method, a knife coating method, a spray coating method, a gravure coating method, a screen printing method and an electrostatic coating method.

Examples of drying methods include drying by being left and drying using a blowing dryer, a hot air dryer, an infrared heating machine, and an infrared heating machine, but the present invention is not particularly limited thereto.

After coating, a rolling treatment may be performed using a lithographic press, calendar rollers or the like. The thickness of the formed film is, for example, 1 μm or more and 500 μm or less, and preferably 10 μm or more and 300 μm or less.

A coating formed using a conductive material dispersion can also be used as a base layer for the electrode mixture layer in order to improve the adhesion between the electrode mixture layer and the collector or to improve conductivity of the electrode film.

<Secondary Battery>

A secondary battery according to one embodiment of the present invention includes a positive electrode, a negative electrode, and an electrolyte, and at least one selected from the group consisting of the positive electrode and the negative electrode includes the electrode film.

As the electrolyte, various conventionally known substances in which ions can move can be used. Examples thereof include those containing a lithium salt such as $LiBF_4$, $LiClO_4$, $LiPF_6$, $LiAsF_6$, $LiSbF_6$, $LiCF_3SO_3$, $Li(CF_3SO_2)_2N$, $LiC_4F_9SO_3$, $Li(CF_3SO_2)_3C$, LiI, LiBr, LiCl, LiAlCl, $LiHF_2$, LiSCN, or $LiBPh_4$ (where, Ph is a phenyl group), but the present invention is not limited thereto. The electrolyte is preferably dissolved in a non-aqueous solvent and used as an electrolytic solution.

The non-aqueous solvent is not particularly limited, and examples thereof include carbonates such as ethylene carbonate, propylene carbonate, butylene carbonate, dimethyl carbonate, ethyl methyl carbonate, and diethyl carbonate; lactones such as γ-butyrolactone, γ-valerolactone, and γ-octanoic lactone; glymes such as tetrahydrofuran, 2-methyltetrahydrofuran, 1,3-dioxolane, 4-methyl-1,3-dioxolane, 1,2-methoxyethane, 1,2-ethoxyethane, and 1,2-dibutoxyethane; esters such as methyl formate, methyl acetate, and methyl propionate; sulfoxides such as dimethylsulfoxide and sulfolane; and nitriles such as acetonitrile. These solvents may be used alone or two or more thereof may be used in combination.

The secondary battery preferably includes a separator. Examples of separators include polyethylene nonwoven fabrics, polypropylene nonwoven fabrics, polyamide nonwoven fabrics and non-woven fabrics obtained by subjecting these to a hydrophilic treatment, but the present invention is not particularly limited thereto.

The structure of the secondary battery according to the above embodiment is not particularly limited, and generally includes a positive electrode and a negative electrode and a separator that is provided as necessary, and can have various shapes such as a paper shape, a cylindrical shape, a button shape, and a laminated shape depending on the purpose of use.

EXAMPLES

The present invention will be described below in detail with reference to examples. The present invention is not limited to the following examples as long as other examples do not depart from the gist thereof. Here, unless otherwise specified, "parts" indicates "parts by mass" and "%" indicates "mass %."

<Synthesis of Polymer>

Synthesis Example 1

(Synthesis of Dispersant 1)

100 parts of ethyl acetate, 86.0 parts of acrylonitrile, 14.0 parts of acrylic acid, and 0.5 parts of 3-mercapto-1,2-propanediol were put into a reaction container including a gas inlet tube, a thermometer, a condenser, and a stirrer, and purging with nitrogen gas was performed. The inside of the reaction container was heated to 70° C., a mixture containing 10 parts of ethyl acetate and 0.4 parts of 2,2'-azobis(2,4-dimethylvaleronitrile) (V-65 commercially available from FUJIFILM Wako Pure Chemical Corporation) was added dropwise into the reaction container over 6 hours, and a polymerization reaction was performed. After dropwise addition was completed, the mixture was reacted at 70° C. for 1 hour, 0.1 parts of V-65 was then added, the reaction was additionally continued at 70° C. for 1 hour, and a desired product was obtained as a precipitate. Then, the non-volatile content was measured, and it was confirmed that the conversion rate was larger than 98%.

The product was separated by filtration under a reduced pressure, washed with 100 parts of ethyl acetate, and dried under a reduced pressure, and the solvent was completely removed to obtain a dispersant 1. The dispersant 1 is a composition containing the polymer (A) described above, a very small amount of a component (B) and a polymer (E).

The content of each structural unit shown in Table 1, the weight average molecular weight (Mw), the content of the component (B), and the content of the polymer (E) are as shown in Table 2.

Synthesis Example 2

(Synthesis of Dispersant 2)

A dispersant 2 was produced in the same manner as in Synthesis Example 1 except that the monomers used were changed to 72.0 parts of acrylonitrile and 28.0 parts of acrylic acid.

The content of each structural unit shown in Table 1, the weight average molecular weight (Mw), the content of the component (B), and the content of the polymer (E) are as shown in Table 2. Here, in the polymer synthesis, Mw was adjusted by adding a chain transfer agent, adjusting the amount of a polymerization initiator, and changing reaction conditions and the like.

Synthesis Example 3

(Synthesis of Dispersant 3 and Comparative Dispersant 1)

100 parts of acetonitrile, 86.0 parts of acrylonitrile, 14.0 parts of itaconic acid, and 0.5 parts of 3-mercapto-1,2-propanediol were put into a reaction container including a gas inlet tube, a thermometer, a condenser, and a stirrer, and purging with nitrogen gas was performed. The inside of the reaction container was heated to 70° C., a mixture containing 10 parts of methyl ethyl ketone and 0.4 parts of 2,2'-azobis(2,4-dimethylvaleronitrile) (V-65 commercially available from FUJIFILM Wako Pure Chemical Corporation) was added dropwise into the reaction container over 6 hours, and a polymerization reaction was performed. After dropwise addition was completed, the mixture was reacted at 70° C. for 1 hour, 0.1 parts of V-65 was then added, the reaction was additionally continued at 70° C. for 1 hour, and a desired product was obtained as a precipitate. Then, the non-volatile content was measured, and it was confirmed that the conversion rate was larger than 98%.

The product was separated by filtration under a reduced pressure, half of the product was separated and dried under a reduced pressure, and the solvent was completely removed to obtain a comparative dispersant 1. On the other hand, the remaining half was washed with 100 parts of ethyl acetate and dried under a reduced pressure, and the solvent was completely removed to obtain a dispersant 3.

The content of each structural unit shown in Table 1, the weight average molecular weight (Mw), the content of the component (B), and the content of the polymer (E) are as shown in Table 2.

Synthesis Example 4

(Synthesis of Dispersant 4)

A dispersant 4 was produced in the same manner as in Synthesis Example 1 except that monomers used were changed to 86.0 parts of methacrylonitrile and 14.0 parts of itaconic acid.

The content of each structural unit shown in Table 1, the weight average molecular weight (Mw), the content of the component (B), and the content of the polymer (E) are as shown in Table 2. Here, in the polymer synthesis, Mw was adjusted by adding a chain transfer agent, adjusting the amount of a polymerization initiator, and appropriately changing reaction conditions and the like.

Synthesis Example 5

(Synthesis of Dispersant 5)

100 parts of methanol, 65.0 parts of acrylonitrile, 35.0 parts of vinyl acetate, and 0.5 parts of 3-mercapto-1,2-propanediol were put into a reaction container including a gas inlet tube, a thermometer, a condenser, and a stirrer, and purging with nitrogen gas was performed. The inside of the reaction container was heated to 70° C., a mixture containing 10 parts of methyl ethyl ketone and 0.4 parts of 2,2'-azobis(2,4-dimethylvaleronitrile) (V-65 commercially available from FUJIFILM Wako Pure Chemical Corporation) was added dropwise into the reaction container over 6 hours, and a polymerization reaction was performed. After dropwise addition was completed, the mixture was reacted at 70° C. for 1 hour, 0.1 parts of V-65 was then added, and the reaction was additionally continued at 70° C. for 1 hour to obtain a copolymer/methanol mixed solution. Subsequently, 40 parts of a 2 mol/L sodium hydroxide/methanol solution in terms of the amount of sodium hydroxide was added, and the mixture was heated to 60° C. and reacted for 4 hours and completely saponified. Subsequently, the product was separated by filtration under a reduced pressure, washed with 100 parts of methanol, additionally washed with 100 parts of ethyl acetate, and dried under a reduced pressure, and the solvent was completely removed to obtain a dispersant 5.

The content of each structural unit shown in Table 1, the weight average molecular weight (Mw), the content of the component (B), and the content of the polymer (E) are as shown in Table 2. Here, it was confirmed that some cyano groups were modified to amide groups according to sodium hydroxide used in the saponification reaction.

Synthesis Example 6

(Synthesis of Dispersant 6)

100 parts of methanol, 67.0 parts of acrylonitrile, 8.0 parts of acrylic acid, 35.0 parts of vinyl acetate, and 1.0 part of 3-mercapto-1,2-propanediol were put into a reaction container including a gas inlet tube, a thermometer, a condenser, and a stirrer, and purging with nitrogen gas was performed. The inside of the reaction container was heated to 70° C., a mixture containing 10 parts of methyl ethyl ketone and 0.4 parts of 2,2'-azobis(2,4-dimethylvaleronitrile) (V-65 commercially available from FUJIFILM Wako Pure Chemical Corporation) was added dropwise into the reaction container over 6 hours, and a polymerization reaction was performed.

After dropwise addition was completed, the mixture was reacted at 70° C. for 1 hour, 0.1 parts of V-65 was then added, and the reaction was additionally continued at 70° C. for 1 hour to obtain a copolymer/methanol mixed solution.

Subsequently, 40 parts of a 2 mol/L sodium hydroxide/methanol solution in terms of the amount of sodium hydroxide was added, the mixture was heated to 60° C. and reacted for 4 hours and completely saponified. Subsequently, the product was separated by filtration under a reduced pressure, washed with 100 parts of methanol, additionally washed with 100 parts of ethyl acetate, and dried under a reduced pressure, and the solvent was completely removed to obtain a dispersant 6.

The content of each structural unit shown in Table 1, the weight average molecular weight (Mw), the content of the component (B), and the content of the polymer (E) are as shown in Table 2. Here, it was confirmed that some cyano groups were modified to amide groups according to sodium hydroxide used in the saponification reaction.

Synthesis Example 7

(Synthesis of Dispersant 7)

100 parts of methanol, 0.1 parts of diethanolamine, and 5 parts of sodium hypophosphite were put into a reaction container including a gas inlet tube, a thermometer, a condenser, and a stirrer, and purging with nitrogen gas was performed. The inside of the reaction container was heated to 70° C., and 65 parts of acrylonitrile and 35 parts of N-vinyl-2-pyrrolidone were added dropwise over 2 hours. Subsequently, an aqueous initiator solution containing 2 parts of 2,2'-azobis-2-amidinopropane dihydrochloride (V-50 commercially available from FUJIFILM Wako Pure Chemical Corporation) and 18 parts of deionized water was added dropwise over an hour and a half. After dropwise addition was completed, the mixture was reacted for 3.5 hours, an aqueous solution containing 0.1 parts of V-50 and 0.9 parts of deionized water was then added, and after another 30 minutes, an aqueous solution containing 0.1 parts of V-50 and 0.9 parts of deionized water was added again.

It was confirmed that, after 4.5 hours from when polymerization started, the conversion rate was 95%, and 0.5 parts of a 10% malonic acid aqueous solution as a pH adjusting agent was added to obtain a polymer water dispersion solution. Subsequently, the product was separated by filtration under a reduced pressure, washed with methanol, and dried under a reduced pressure, and the solvent was completely removed to obtain a dispersant 7.

The content of each structural unit shown in Table 1, the weight average molecular weight (Mw), the content of the component (B), and the content of the polymer (E) are as shown in Table 2.

Synthesis Example 8

(Synthesis of Dispersant 8 and Comparative Dispersant 2)

1,000 parts of deionized water, 95 parts of acrylic acid, 5 parts of acrylonitrile, and 5 parts of ammonium persulfate (commercially available from FUJIFILM Wako Pure Chemical Corporation) as a polymerization initiator were put into a reaction container including a thermometer, a condenser, and a stirrer, the mixture was heated to 70° C. and stirred at temperature of 70° C. for 300 minutes (5 hours). When the conversion rate reached 90% or more, cooling was performed and the reaction was terminated.

Then, pH was adjusted to 8.0 with a 4% sodium hydroxide aqueous solution, unreacted raw materials were reduced by heating, reducing pressure, and distillation to obtain an aqueous polymer solution. Half of the aqueous polymer solution was separated and dried to obtain a comparative dispersant 2. On the other hand, 250 parts of methyl ethyl ketone and 250 parts of methanol were put into a 4-neck separable flask and the flask was rotated 1,000 times with a disper, and the remaining aqueous polymer solution was added dropwise over 1 hour. The produced white precipitate was collected by filtration and dried under a reduced pressure to obtain a dispersant 8. The content of each structural unit shown in Table 1, the weight average molecular weight (Mw), the content of the component (B), and the content of the polymer (E) are as shown in Table 2.

Synthesis Example 9

(Synthesis of Dispersant 9)

50 parts of deionized water, 50 parts of methanol, 0.1 parts of diethanolamine, 5 parts of sodium hypophosphite, 27 parts of 2-hydroxyethyl acrylate, and 73 parts of N-vinyl-2-pyrrolidone were put into a reaction container including a gas inlet tube, a thermometer, a condenser, and a stirrer, and purging with nitrogen gas was performed. The inside of the reaction container was heated to 70° C. and left for 2 hours. An aqueous initiator solution containing 2 parts of 2,2'-azobis-2-amidinopropane dihydrochloride (V-50 commercially available from FUJIFILM Wako Pure Chemical Corporation) and 18 parts of deionized water was added dropwise over an hour and a half.

After dropwise addition was completed, the mixture was reacted for 3.5 hours, an aqueous solution containing 0.1 parts of V-50 and 0.9 parts of deionized water was then added, and after another 30 minutes, an aqueous solution containing 0.1 parts of V-50 and 0.9 parts of deionized water was added again. It was confirmed that the conversion rate was 90%, and 1.4 parts of a 10% malonic acid aqueous solution as a pH adjusting agent was added to obtain a polymer water dispersion solution. Then, the product was separated by filtration under a reduced pressure, washed with a mixed solution containing 50 parts of methanol and 50 parts of deionized water and dried under a reduced pressure, and the solvent was completely removed to obtain a dispersant 9.

The content of each structural unit shown in Table 1, the weight average molecular weight (Mw), the content of the component (B), and the content of the polymer (E) are as shown in Table 2.

Synthesis Example 10

(Synthesis of Dispersant 10 and Comparative Dispersant 3)

100 parts of methanol and 100 parts of vinyl acetate were put into a reaction container including a gas inlet tube, a thermometer, a condenser, and a stirrer, and purging with nitrogen gas was performed. The inside of the reaction container was heated to 50° C., 0.5 parts of 2,2'-azobis(2-methylpropionic acid methyl ester) (V-601 commercially available from FUJIFILM Wako Pure Chemical Corporation) was added dropwise into the reaction container over 4 hours, and a polymerization reaction was performed. After dropwise addition was completed, the mixture was additionally left for 2 hours at the same temperature.

When the conversion rate reached 95% or more, cooling was performed and the reaction was terminated to obtain a polyvinyl acetate/methanol solution. Subsequently, 60 parts (0.4 equivalents with respect to the amount of acetic acid added) of a 2 mol/L sodium hydroxide/methanol solution in terms of the amount of sodium hydroxide was added, and the mixture was heated to 60° C. and reacted for 4 hours to obtain a polyvinyl alcohol/methanol mixed solution having a degree of saponification of 86 mol %. A white solid obtained by drying under a reduced pressure was pulverized in an agate mortar, and half of the pulverized product was separated to obtain a comparative dispersant 3. On the other hand, the remaining half was suspended in a mixed solution containing 100 parts of methanol and 100 parts of methyl ethyl ketone by emitting ultrasonic wave, filtered and dried under a reduced pressure to obtain a dispersant 10.

The content of each structural unit shown in Table 1, the weight average molecular weight (Mw), the content of the component (B), and the content of the polymer (E) are as shown in Table 2.

Synthesis Example 11

(Synthesis of Dispersant 11)

100 parts of methanol and 100 parts of vinyl acetate were put into a reaction container including a gas inlet tube, a thermometer, a condenser, and a stirrer, and purging with nitrogen gas was performed. The inside of the reaction container was heated to 50° C., 0.5 parts of 2,2'-azobis(2-methylpropionic acid methyl ester) (V-601 commercially available from FUJIFILM Wako Pure Chemical Corporation) was added dropwise into the reaction container over 4 hours, and a polymerization reaction was performed. After dropwise addition was completed, the mixture was additionally left for 2 hours at the same temperature.

When the conversion rate reached 95% or more, cooling was performed and the reaction was terminated to obtain a polyvinyl acetate/methanol solution. Subsequently, 80 parts of a 2 mol/L sodium hydroxide/methanol solution in terms of the amount of sodium hydroxide was added, and the mixture was heated to 70° C. and reacted for 5 hours to obtain a polyvinyl alcohol/methanol mixed solution having a degree of saponification of 98 mol %. Subsequently, 800 parts by mass of deionized water was added to dissolve a polyvinyl alcohol, and 2 parts by mass of hydrochloric acid and 20 parts by mass of butyraldehyde were added dropwise with stirring. The mixture was heated to 80° C. and left for 1 hour, some hydroxyl groups were butyralized, cooling was performed, and the reaction was stopped.

250 parts of methyl ethyl ketone and 250 parts of methanol were put into a 4-neck separable flask and the flask was rotated 1,000 times with a disper, and the polymer solution obtained as described above was added dropwise over 1 hour. The produced white precipitate was collected by filtration and dried under a reduced pressure to obtain a dispersant 11.

The content of each structural unit shown in Table 1, the weight average molecular weight (Mw), the content of the component (B), and the content of the polymer (E) are as shown in Table 2.

Synthesis Example 12

(Synthesis of Dispersant 12 and Comparative Dispersant 4)

100 parts of deionized water, 0.1 parts of diethanolamine, and 5 parts of sodium hypophosphite were put into a reaction container including a gas inlet tube, a thermometer, a condenser, and a stirrer, and purging with nitrogen gas was performed. The inside of the reaction container was heated to 90° C., and 100 parts of N-vinyl-2-pyrrolidone was added dropwise over 2 hours. Subsequently, an aqueous initiator solution containing 2 parts of 2,2'-azobis-2-amidinopropane dihydrochloride (V-50 commercially available from FUJIFILM Wako Pure Chemical Corporation) and 18 parts of deionized water was added dropwise over an hour and a half.

After dropwise addition was completed, the mixture was reacted for 3.5 hours, and an aqueous solution containing 0.1 parts of V-50 and 0.9 parts of deionized water was then added, and after another 30 minutes, an aqueous solution containing 0.1 parts of V-50 and 0.9 parts of deionized water was added again. It was confirmed that, after 4.5 hours from when the polymerization started, the conversion rate was 90%, and 1.4 parts of a 10% malonic acid aqueous solution as a pH adjusting agent was added to obtain a polymer water dispersion solution. Subsequently, the product was separated by filtration under a reduced pressure, half of the product was separated and dried under a reduced pressure, and the solvent was completely removed to obtain a comparative dispersant 4. On the other hand, the remaining half was washed with 100 parts of deionized water and dried under a reduced pressure, and the solvent was completely removed to obtain a dispersant 12.

The content of each structural unit shown in Table 1, the weight average molecular weight (Mw), the content of the component (B), and the content of the polymer (E) are as shown in Table 2.

TABLE 1

| | | | |
|---|---|---|---|
| Nitrile group-containing structural unit | Structural unit 1 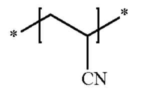 | Heterocycle-containing structural unit | Structural unit 7 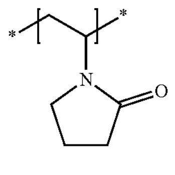 |

TABLE 1-continued

| | | | |
|---|---|---|---|
| | Structural unit 2<br>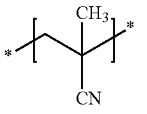 | Other structural unit (amide group) | Structural unit 8<br>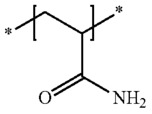 |
| Carboxyl group-containing structural unit | Structural unit 3<br>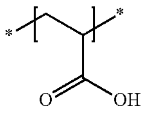 | Other structural unit (acetyl group) | Structural unit 9<br>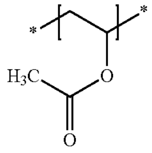 |
| | Structural unit 4<br>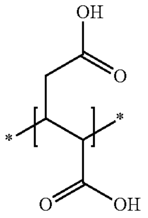 | Other structural unit (acetal group) | Structural unit 10<br>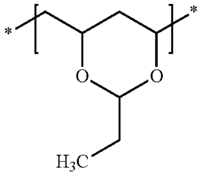 |
| Hydroxyl group-containing structural unit | Structural unit 5<br>[Chem. 5]<br>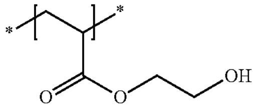 | | |
| | Structural unit 6<br>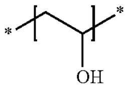 | | |

TABLE 2

| | | Content of each structural unit in polymer (A) [mass %] | | | | | | | |
|---|---|---|---|---|---|---|---|---|---|
| | | Structural unit 1 (nitrile group) | Structural unit 2 | Structural unit 3 (carboxyl group) | Structural unit 4 | Structural unit 5 (hydroxyl group) | Structural unit 6 | Structural unit 7 (heterocycle) | Structural unit 8 (amide group) |
| Synthesis Example 1 | Dispersant 1 | 86 | | 14 | | | | | |
| Synthesis Example 2 | Dispersant 2 | 72 | | 28 | | | | | |
| Synthesis Example 3 | Dispersant 3 Comparative Dispersant 1 | 86 | | | 14 | | | | |
| Synthesis Example 4 | Dispersant 4 | | 86 | | 14 | | | | |
| Synthesis Example 5 | Dispersant 5 | 63 | | | | | 35 | | 2 |
| Synthesis Example 6 | Dispersant 6 | 65 | | 8 | | | 25 | | 2 |
| Synthesis Example 7 | Dispersant 7 | 65 | | | | | | 35 | |
| Synthesis Example 8 | Dispersant 8 Comparative Dispersant 2 | 5 | | 95 | | | | | |
| Synthesis Example 9 | Dispersant 9 | | | | | 27 | | 73 | |

TABLE 2-continued

| | | | | | | |
|---|---|---|---|---|---|---|
| Synthesis Example 10 | Dispersant 10 | | | 86 | | |
| | Comparative Dispersant 3 | | | | | |
| Synthesis Example 11 | Dispersant 11 | | | 84 | | |
| Synthesis Example 12 | Dispersant 12 | | | | 100 | |
| | Comparative Dispersant 4 | | | | | |

| | | Content of each structural unit in polymer (A) [mass %] | | Weight average | | |
|---|---|---|---|---|---|---|
| | | Structural unit 9 (acetyl group) | Structural unit 10 (acetal group) | molecular weight of polymer (A) | Content of polymer (E) (%) | Content of component (B) (%) |
| Synthesis Example 1 | Dispersant 1 | | | 60,000 | 1.1 | 0.12 |
| Synthesis Example 2 | Dispersant 2 | | | 101,000 | 0.4 | 0.29 |
| Synthesis Example 3 | Dispersant 3 | | | 53,000 | 1.4 | 0.040 |
| | Comparative Dispersant 1 | | | | 3.1 | 2.31 |
| Synthesis Example 4 | Dispersant 4 | | | 42,000 | 1.6 | 1.26 |
| Synthesis Example 5 | Dispersant 5 | | | 51,000 | 1.5 | 0.53 |
| Synthesis Example 6 | Dispersant 6 | | | 27,000 | 1.8 | 0.34 |
| Synthesis Example 7 | Dispersant 7 | | | 32,000 | 1.7 | 1.42 |
| Synthesis Example 8 | Dispersant 8 | | | 14,000 | 1.9 | 0.66 |
| | Comparative Dispersant 2 | | | | 5.1 | 2.87 |
| Synthesis Example 9 | Dispersant 9 | | | 26,000 | 1.8 | 1.52 |
| Synthesis Example 10 | Dispersant 10 | 14 | | 17,000 | 1.9 | 1.97 |
| | Comparative Dispersant 3 | | | | 6.1 | 3.44 |
| Synthesis Example 11 | Dispersant 11 | 2 | 14 | 19,000 | 1.9 | 0.011 |
| Synthesis Example 12 | Dispersant 12 | | | 34,000 | 1.6 | 0.79 |
| | Comparative Dispersant 4 | | | | 4.8 | 4.67 |

(Method of Measuring Weight Average Molecular Weight (Mw) of Polymer (A) and Content of Polymer (E))

The weight average molecular weight (Mw) of the synthesized polymer (A) and the content of the polymer (E) were measured through gel permeation chromatograph (GPC) with an RI detector by selecting either a measurement method 1 or a measurement method 2 depending on the solubility of the dispersant (or the comparative dispersant) in water.

0.2 mass % of the dispersant (or the comparative dispersant) was added to a mixed solution containing purified water/methanol=3/7 (volume ratio), ultrasonic waves were emitted for 10 minutes, and when the dispersant (or the comparative dispersant) was completely dissolved, the measurement method 1 was used for measurement. On the other hand, when the dispersant (or the comparative dispersant) did not completely dissolve and was precipitated or suspended, the measurement method 2 was used for measurement.

(Measurement Method 1)

Shodex GPC-101 (commercially available from Showa Denko K.K.) was used as the device used, as separation columns, a total of 4 columns including three columns of "OHpak SB-806M HQ" (commercially available from Showa Denko K.K.) and one column of "OHpak SB-802.5 HQ" (commercially available from Showa Denko K.K.) in order were connected in series, the oven temperature was 40° C., a purified water/methanol=3/7 (volume ratio) solution with 50 mM lithium chloride was used as an eluent, and measurement was performed at a flow rate of 1.0 mL/min. A sample was prepared at a concentration of 0.2 mass % in a mixed solution composed of the above eluent, and 0.1 mL was injected. The molecular weight is a value in terms of polyethylene glycol.

According to the measurement results, the weight average molecular weight (Mw) of the polymer (A) and the content of the polymer (E) having a molecular weight of less than 1,000 were calculated.

(Measurement Method 2)

HLC-8320GPC (commercially available from Tosoh Corporation) was used as the device, and as separation columns, "TSK-GELSUPERAW-4000," "AW-3000," and "AW-2500" (commercially available from Tosoh Corporation) in order were connected in series, the oven temperature was 40° C., a N,N-dimethylformamide solution with 30 mM trimethylamine and 10 mM lithium bromide was used as an eluent, and measurement was performed at a flow rate of 0.6 mL/min. A sample was prepared at a concentration of 0.2 mass % in a solvent composed of the above eluent, and 10 μL was injected. The molecular weight is a value in terms of polystyrene.

According to the measurement results, the weight average molecular weight (Mw) of the polymer (A) and the content of the polymer (E) having a molecular weight of less than 1,000 were calculated.

The amount of the component (B) contained in the dispersant was calculated from the sum of the content of the volatile component obtained by the following and the content of sodium acetate. Table 2 shows the content of the component (B) contained in each dispersant.

(Quantification of Volatile Component)

The content of the volatile component in the obtained dispersants and comparative dispersants was calculated by subtracting the amount of moisture quantified by Karl Fischer from the weight loss during a heat treatment in a hot air oven. About 0.5 g of the sample was collected and spread on an aluminum dish, left in a hot air oven at 150° C. for 10 minutes, and then cooled in a desiccator for 3 minutes, the weight after drying was quickly measured, and the weight loss rate Gi (%) was calculated.

The amount of moisture $G_2$ (%) was measured by a Karl Fischer method by treating a sample at 150° C. under a nitrogen gas flow of 250 ml/min using a Karl Fischer moisture meter (desktop coulometric type moisture meter CA-200 type: commercially available from Mitsubishi Chemical Analytech Co., Ltd., catholyte: commercially available from Mitsubishi Chemical Corporation, Aquamicron (trademark) CXU, anolyte: commercially available from Mitsubishi Chemical Corporation, Aquamicron (trademark) AX). The content of the volatile component was calculated as $G_1$–$G_2$ (%).

(Quantification of Sodium Acetate Through Ion Chromatography)

The dispersants 5, 6, 10, and 11, and the comparative dispersant 3 were sieved with a sieve (according to JIS STANDARD Z8801-1 to 3) having an opening of 1 mm (16 meshes). 10 g of the powder passed through the above sieve was dried at 100° C. for 1 hour to remove volatile components. Next, the powder from which volatile components were removed and 50 mL of ultra-pure water were put into a 100 mL Erlenmeyer flask with common stopper, a cooling condenser was attached, and the mixture was stirred at 95° C. for 10 hours for extraction.

The obtained extraction solution was diluted 100-fold with ultra-pure water, filtration was performed, and the resin content was then removed using a solid phase extraction column (InertSep HLB commercially available from GL Sciences Inc.). Then, using the obtained solution, the amount of sodium acetate was calculated through ion chromatograph ("ICS2000" commercially available from Thermo Fisher Scientific K.K.). Here, during quantification, a calibration curve prepared using an acetic acid aqueous solution was used.

Here, when each dispersant was analyzed through gas chromatography, as the compound formed by inactivation of a polymerization initiator without polymerization, the compounds 11 to 13 shown in Table 3 were detected from the dispersants 1 to 6 and the comparative dispersant 1, the compounds 14 to 16 were detected from the dispersants 7, 9, and 12 and the comparative dispersant 4, the compound 17 was detected from the dispersant 8 and the comparative dispersant 2, and the compounds 18 to 20 were detected from the dispersants 10 and 11, and the comparative dispersant 3.

TABLE 3

Compound 11

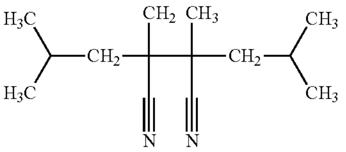

TABLE 3-continued

Compound 12

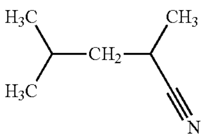

Compound 13

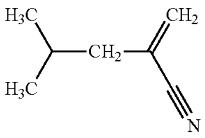

Compound 14

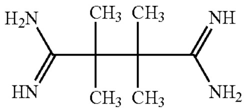

Compound 15

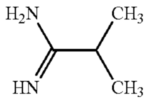

Compound 16

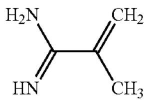

Compound 17

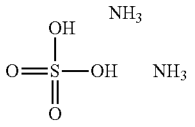

Compound 18

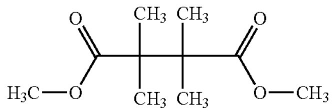

Compound 19

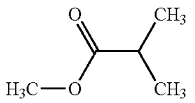

Compound 20

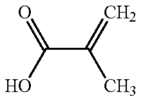

(Analysis of Content of Structural Unit of Polymer (A) by Nuclear Magnetic Resonance)

The contents of the nitrile group-containing structural unit, the carboxyl group-containing structural unit, the hydroxyl group-containing structural unit, and the heterocycle-containing structural unit were determined using a nuclear magnetic resonance device (ADVANCE400Nanobay: Bruker Japan) from a $^1$H-NMR quantitative spectrum obtained using a measurement solvent $(D_3C)_2S{=}O$, and a 1 mm NMR tube and a $^{13}$C-NMR quantitative spectrum obtained using a measurement solvent $(D_3C)_2S{=}O$, and a 10 mm NMR tube. However, when a peak derived from a structure in which a polymerization initiator or a chain transfer agent was bound to a polymer was detected, the content was calculated by excluding it from the content of each structural unit in the polymer (A).

<Production of Conductive Material Dispersion>

Example 1-1

According to the composition shown in Table 4, a total of 1 kg of deionized water, a dispersant, and an additive was put into a stainless steel container, and the mixture was stirred with a disper until it became uniform. Then, the conductive material was added while stirring with a disper, a square-hole high shear screen was attached to a high shear mixer (L5M-A, commercially available from Silverson Co., Ltd.), and batch type dispersion was performed at a speed of 8,000 rpm until the entire component became uniform and the dispersion particle size measured with a grind gauge was 250 μm or less. In this case, the dispersion particle size checked with a grind gauge was 180 μm.

Subsequently, a solution to be dispersed was supplied from the stainless steel container through a pipe to a high pressure homogenizer (Star Burst Labo HJP-17007, commercially available from Sugino Machine Ltd.) and subjected to a 20-pass type dispersion treatment until D50 became 100 μm or less. The dispersion treatment was performed using a single nozzle chamber with a nozzle diameter of 0.25 mm at a pressure of 100 MPa. The obtained conductive material dispersion (dispersion 1) had low viscosity and favorable storage stability.

Examples 1-2 to 1-16

According to the composition shown in Table 4, respective dispersions (dispersions 2 to 16) were obtained in the same manner as in Example 1-1. However, when the median diameter was 100 μm or more, an additional 2-pass dispersion treatment was performed, measurement was performed again, and the treatment was repeated until the median diameter became 100 μm or less. All of the conductive material dispersions (dispersions 2 to 16) according to one embodiment of the present invention had low viscosity and favorable storage stability.

Comparative Examples 1-1 to 1-4

According to the composition shown in Table 4, a total of 1 kg of deionized water, a dispersant, and an additive was put into a stainless steel container, and the mixture was stirred with a disper until it became uniform. Then, the conductive material was added while stirring with a disper, a square-hole high shear screen was attached to a high shear mixer (L5M-A, commercially available from Silverson Co., Ltd.), and batch type dispersion was performed at a speed of 8,000 rpm. However, in all cases, since the dispersion particle size did not reach 250 μm or less even after three hours, it was determined that dispersion was not possible.

Therefore, the amount of the antifoaming agent shown in Table 4 was added, and batch type dispersion was performed again until the entire component became uniform and the dispersion particle size was 250 μm or less. Subsequently, a solution to be dispersed was supplied from the stainless steel container through a pipe to a high pressure homogenizer (Star Burst Labo HJP-17007, commercially available from Sugino Machine Ltd.) and subjected to a 30-pass type dispersion treatment until D50 became 100 μm or less. The dispersion treatment was performed using a single nozzle chamber with a nozzle diameter of 0.25 mm at a pressure of 100 MPa.

All of the conductive material dispersions (comparative dispersions 1 to 4) produced by adding an antifoaming agent had relatively low viscosity and favorable storage stability, but the complex elastic modulus or the phase angle was poor.

(Method of Measuring Specific Surface Area of Carbon-Based Conductive Material)

0.03 g of the carbon-based conductive material was weighed out using an electronic scale (MSA225S100DI commercially available from Sartorius), and then dried at 110° C. for 15 minutes while deaerating. Then, the specific surface area ($m^2/g$) of the carbon-based conductive material was measured using a fully automatic specific surface area measuring device (HM-model 1208 commercially available from MOUNTECH).

(Method of Measuring Dispersion Particle Size of Conductive Material Dispersion)

The dispersion particle size was obtained by a determination method according to JIS K 5600-2-5 using a grind gauge with a maximum groove depth of 300 μm.

(Method of Measuring Particle Size Distribution by Dynamic Light Scattering Method)

After the conductive material dispersion was left in a thermostatic chamber at 25° C. for 1 hour or longer, the conductive material dispersion was sufficiently stirred and diluted, and the cumulative particle size D10 and the cumulative particle size D50 of the conductive material dispersion were then measured using a particle size distribution meter (Nanotrac UPA, model UPA-EX commercially available from MicrotracBel Corp.). The particle refractive index of the carbon-based conductive material was 1.8, and the shape was nonspherical. The refractive index of the solvent was 1.333. During measurement, the concentration of the CNT dispersion solution was diluted so that the numerical value of the loading index was in a range of 0.8 to 1.2.

<Determination Criteria (D10)>

◎: 100 nm or more and less than 400 nm (excellent)
○: 50 nm or more and less than 100 nm (good)

<Determination Criteria (D50)>

◎: 200 nm or more and less than 1,500 nm (excellent)
○: 1,500 nm or more and less than 3,000 nm (good)

(Complex Elastic Modulus and Phase Angle of Conductive Material Dispersion)

The complex elastic modulus and the phase angle of the conductive material dispersion were evaluated by performing dynamic viscoelasticity measurement using a rheometer with a diameter of 35 mm and 2° cone (RheoStress 1 rotational rheometer commercially available from Thermo Fisher Scientific) at 25° C. and a frequency of 1 Hz in a strain rate range of 0.01% to 5%.

<Determination Criteria (Complex Elastic Modulus)>

◎: 5 Pa or more and less than 50 Pa (excellent)
○: 5 Pa or more and less than 10 Pa (good)
Δ: less than 5 Pa (poor)

<Determination Criteria (Phase Angle)>

◎: 10° or more and less than 50° (excellent)
○: 3° or more and less than 10° (good)
Δ: less than 3° (poor)

(Viscosity of Conductive Material Dispersion)

After the conductive material dispersion was left in a thermostatic chamber at 25° C. for 1 hour or longer, the conductive material dispersion was sufficiently stirred, and evaluation was then performed by measuring the shear viscosity at 25° C. and a shear rate of 1 $s^{-1}$ and 10 $s^{-1}$ using a rheometer with a diameter of 35 mm and 2° cone (RheoStress 1 rotational rheometer commercially available from Thermo Fisher Scientific).

<Determination Criteria (a Shear Rate of 1/s)>

◎: 5,000 Pa·s or more and less than 30,000 Pa·s (excellent)

○: 500 Pa·s or more and less than 5,000 Pa·s (good)

<Determination Criteria (a Shear Rate of 10/s)>:

◎: 500 Pa·s or more and less than 3,000 Pa·s (excellent)

○: 100 Pa·s or more and less than 500 Pa·s (good)

TABLE 4

| | Conductive material dispersion | Conductive material Type | Conductive material Amount added (%) | Dispersant Type | Dispersant Amount added (%) | Additive Type | Additive Amount added (%) | Antifoaming agent Amount added (%) |
|---|---|---|---|---|---|---|---|---|
| Example 1-1 | Dispersion 1 | BT1003M | 3.0 | Dispersant 1 | 0.75 | $Na_2CO_3$ | 0.15 | — |
| Example 1-2 | Dispersion 2 | BT1003M | 3.0 | Dispersant 2 | 0.75 | $Na_2CO_3$ | 0.15 | — |
| Example 1-3 | Dispersion 3 | BT1003M | 3.0 | Dispersant 3 | 0.75 | $Na_2CO_3$ | 0.15 | — |
| Example 1-4 | Dispersion 4 | BT1003M | 3.0 | Dispersant 4 | 0.75 | $Na_2CO_3$ | 0.15 | — |
| Example 1-5 | Dispersion 5 | BT1003M | 3.0 | Dispersant 5 | 0.75 | $Na_2CO_3$ | 0.15 | — |
| Example 1-6 | Dispersion 6 | BT1003M | 3.0 | Dispersant 6 | 0.75 | $Na_2CO_3$ | 0.15 | — |
| Example 1-7 | Dispersion 7 | BT1003M | 3.0 | Dispersant 7 | 0.75 | $Na_2CO_3$ | 0.15 | — |
| Example 1-8 | Dispersion 8 | BT1003M | 3.0 | Dispersant 8 | 0.75 | octylamine | 0.15 | — |
| Example 1-9 | Dispersion 9 | BT1003M | 3.0 | Dispersant 9 | 0.75 | 2-aminoethanol | 0.15 | — |
| Example 1-10 | Dispersion 10 | BT1003M | 3.0 | Dispersant 10 | 0.75 | $Li_2CO_3$ | 0.15 | — |
| Example 1-11 | Dispersion 11 | BT1003M | 3.0 | Dispersant 11 | 0.75 | KOH | 0.15 | — |
| Example 1-12 | Dispersion 12 | BT1003M | 3.0 | Dispersant 12 | 0.75 | NaOH | 0.15 | — |
| Example 1-13 | Dispersion 13 | 6A | 1.6 | Dispersant 3 | 0.80 | $Na_2CO_3$ | 0.16 | — |
| Example 1-14 | Dispersion 14 | TUBALL | 0.4 | Dispersant 3 | 0.40 | $Na_2CO_3$ | 0.08 | — |
| Example 1-15 | Dispersion 15 | TNSR | 0.4 | Dispersant 3 | 0.40 | $Na_2CO_3$ | 0.08 | — |
| Example 1-16 | Dispersion 16 | Li-400 | 15.0 | Dispersant 3 | 0.75 | $Na_2CO_3$ | 0.15 | — |
| Comparative Example 1-1 | Comparative Dispersion 1 | BT1003M | 3.0 | Comparative Dispersant 2 | 0.75 | $Na_2CO_3$ | 0.15 | 0.02 |
| Comparative Example 1-2 | Comparative Dispersion 2 | BT1003M | 3.0 | Comparative Dispersant 1 | 0.75 | $Na_2CO_3$ | 0.15 | 0.02 |
| Comparative Example 1-3 | Comparative Dispersion 3 | BT1003M | 3.0 | Comparative Dispersant 3 | 0.75 | $Na_2CO_3$ | 0.15 | 0.02 |
| Comparative Example 1-4 | Comparative Dispersion 4 | BT1003M | 3.0 | Comparative Dispersant 4 | 0.75 | $Na_2CO_3$ | 0.15 | 0.02 |

| | Water Amount added (%) | Amount of dispersant vs conductive material | Amount of additive vs dispersant | D10 (nm) | D50 (nm) | Complex elastic modulus (Pa) | Phase angle (°) | Viscosity at 1/s (Pa · s) | Viscosity at 10/s (Pa · s) |
|---|---|---|---|---|---|---|---|---|---|
| Example 1-1 | 96.10 | 25% | 20% | 210 | 300 | ○ | ◎ | ◎ | ◎ |
| Example 1-2 | 96.10 | 25% | 20% | 220 | 350 | ◎ | ◎ | ◎ | ◎ |
| Example 1-3 | 96.10 | 25% | 20% | 200 | 280 | ○ | ◎ | ◎ | ◎ |
| Example 1-4 | 96.10 | 25% | 20% | 180 | 240 | ○ | ◎ | ◎ | ○ |
| Example 1-5 | 96.10 | 25% | 20% | 170 | 230 | ○ | ○ | ○ | ◎ |
| Example 1-6 | 96.10 | 25% | 20% | 200 | 280 | ○ | ◎ | ◎ | ○ |
| Example 1-7 | 96.10 | 25% | 20% | 100 | 270 | ○ | ○ | ○ | ◎ |
| Example 1-8 | 96.10 | 25% | 20% | 120 | 250 | ○ | ◎ | ◎ | ◎ |
| Example 1-9 | 96.10 | 25% | 20% | 130 | 240 | ○ | ◎ | ◎ | ○ |
| Example 1-10 | 96.10 | 25% | 20% | 110 | 210 | ○ | ○ | ○ | ◎ |
| Example 1-11 | 96.10 | 25% | 20% | 120 | 200 | ○ | ○ | ○ | ◎ |
| Example 1-12 | 96.10 | 25% | 20% | 100 | 220 | ○ | ○ | ○ | ◎ |
| Example 1-13 | 97.44 | 50% | 20% | 100 | 320 | ○ | ◎ | ◎ | ◎ |
| Example 1-14 | 99.12 | 100% | 20% | 360 | 2950 | ◎ | ◎ | ◎ | ◎ |
| Example 1-15 | 99.12 | 100% | 20% | 320 | 880 | ◎ | ◎ | ◎ | ◎ |
| Example 1-16 | 84.10 | 5% | 20% | 100 | 230 | ○ | ○ | ◎ | ◎ |
| Comparative Example 1-1 | 96.10 | 25% | 20% | 70 | 250 | Δ | ○ | ○ | ○ |
| Comparative Example 1-2 | 96.10 | 25% | 20% | 80 | 250 | ○ | Δ | ○ | ○ |

TABLE 4-continued

| | | | | | | | | | |
|---|---|---|---|---|---|---|---|---|---|
| Comparative Example 1-3 | 96.10 | 25% | 20% | 70 | 230 | Δ | ○ | ○ | ○ |
| Comparative Example 1-4 | 96.10 | 25% | 20% | 80 | 220 | ○ | Δ | ○ | ○ |

Here, raw materials shown in Table 4 are as follows.

BT1003M: LUCAN BT1003M (commercially available from LG chemLtd., multi-walled CNT, an average outer diameter of 13 nm, an average fiber diameter of 32 μm, a specific surface area of 201 $m^2/g$).

6A: JENOTUBE6A (commercially available from JEIO, multi-walled CNT, an average outer diameter of 6 nm, an average fiber diameter of 58 μm, a specific surface area of 700 $m^2/g$ TUBALL: single-walled carbon nanotube (commercially available from OCSiAl, an average outer diameter of 1.7 nm, an average fiber diameter of 21 μm, a specific surface area of 490 $m^2/g$).

TNSR: single-walled carbon nanotube (commercially available from Timesnano, an average outer diameter of 1.5 nm, an average fiber diameter of 18 μm, a specific surface area of 610 $m^2/g$)

Li-400: Denka Black Li-400 (commercially available from Denka Co., Ltd., acetylene black, an average primary particle size of 48 nm, a specific surface area of 39 $m^2/g$, an acidic group amount of 0.21 $\mu mol/m^2$, 205 μmol/g)

antifoaming agent: SURFYNOL 104E, commercially available from Shin-Etsu Chemical Co., Ltd.

<Foamability Test>

Test Examples 1 to 8

0.25 g of each dispersant or comparative dispersant shown in Table 5 and 0.05 g of sodium carbonate were put into a 70 ml mayo bottle, deionized water was added so that the total weight was 50 g and the bottle was covered, and the mixture was stirred for 15 minutes with a paint conditioner (commercially available from Red Devil). Immediately, the sample was left on a horizontal table for 2 hours, and the height of air bubbles remaining on the liquid surface was recorded. The evaluation results are shown in Table 5.

<Determination Criteria>

○: the height of air bubbles after being left for 1 minute was less than 0.5 cm (good)

Δ: the height of air bubbles after being left for 1 minute was 0.5 cm or more and less than 1.5 cm (poor)

x: the height of air bubbles after being left for 1 minute was 1.5 cm or more (unacceptable)

Test Examples 9 to 27

An "intentionally added raw material-derived component" was added to 0.25 g of each dispersant shown in Table 5 and 0.05 g of sodium carbonate so that the content thereof was 2.5 mass % with respect to the dispersant, deionized water was additionally added so that the total weight was 50 g, and the container was covered, and a foamability test was performed in the same manner as in Test Examples 1 to 8. The determination criteria were also the same. Here, the "intentionally added raw material-derived component" is each component specified as the component (B) derived from the raw material of the polymer (A). The evaluation results are shown in Table 5.

Here, as the compound formed by inactivation of a polymerization initiator without polymerization, a mixture of compounds 11, 12, and 13 shown in Table 5 was prepared as follows. 97 parts of methyl ethyl ketone was put into a reaction container including a gas inlet tube, a thermometer, a condenser, and a stirrer, purging with nitrogen gas was performed, and the inside of the reaction container was heated to 51° C. and left for 15 minutes. 3 parts of 2,2'-azobis(2,4-dimethylvaleronitrile) (V-65) was added dropwise and the mixture was left at 51° C. for 4 hours and then dried under a reduced pressure at 25° C. to obtain a white solid. The white solid was analyzed through gas chromatography in the same manner as the analysis of the component (B), and confirmed to include Compounds 11, 12, and 13.

In addition, the mixture of compounds 14, 15, and 16 shown in Table 5 was prepared as follows. 97 parts of deionized water was put into the reaction container including a gas inlet tube, a thermometer, a condenser, and a stirrer, purging with nitrogen gas, and the inside of the reaction container was heated to 56° C. and left for 15 minutes. 3 parts of 2,2'-azobis-2-amidinopropane dihydrochloride (V-50) was added dropwise, and the mixture was left at 56° C. for 4 hours and then cooled. The obtained aqueous solution was analyzed through gas chromatography in the same manner as the analysis of the component (B), and confirmed to include Compounds 14, 15, and 16. The amount of the mixture of Compounds 14, 15, and 16 added was converted to a solid component of 3 mass %.

TABLE 5

| | | Intentionally added raw material-derived component | | |
|---|---|---|---|---|
| | Dispersant Type | Type | Amount added vs dispersant (%) | Foamability |
| Test Example 1 | Dispersant 1 | — | — | ○ |
| Test Example 2 | Dispersant 8 | — | — | ○ |
| Test Example 3 | Dispersant 11 | — | — | ○ |
| Test Example 4 | Dispersant 12 | — | — | ○ |
| Test Example 5 | Comparative Dispersant 1 | — | — | x |
| Test Example 6 | Comparative Dispersant 2 | — | — | x |
| Test Example 7 | Comparative Dispersant 3 | — | — | x |
| Test Example 8 | Comparative Dispersant 4 | — | — | x |

TABLE 5-continued

| | Dispersant Type | Intentionally added raw material-derived component Type | Amount added vs dispersant (%) | Foamability |
|---|---|---|---|---|
| Test Example 9 | Dispersant 1 | acrylonitrile | 2.5 | x |
| Test Example 10 | ↑ | methacrylonitrile | 2.5 | x |
| Test Example 11 | ↑ | acrylic acid | 2.5 | x |
| Test Example 12 | ↑ | itaconic acid | 2.5 | x |
| Test Example 13 | ↑ | sodium acrylate | 2.5 | x |
| Test Example 14 | ↑ | sodium itaconate | 2.5 | x |
| Test Example 15 | ↑ | acetic acid | 2.5 | x |
| Test Example 16 | ↑ | sodium acetate | 2.5 | x |
| Test Example 17 | ↑ | vinyl acetate | 2.5 | x |
| Test Example 18 | ↑ | acrylamide | 2.5 | x |
| Test Example 19 | ↑ | hydroxyethyl acrylate | 2.5 | x |
| Test Example 20 | ↑ | mixture of compounds (11), (12), and (13) | 2.5 | x |
| Test Example 21 | ↑ | mixture of compounds (14), (15), and (16) | 2.5 | x |
| Test Example 22 | ↑ | ammonium sulfate | 2.5 | x |
| Test Example 23 | Dispersant 8 | acrylic acid | 2.5 | x |
| Test Example 24 | ↑ | sodium acrylate | 2.5 | x |
| Test Example 25 | Dispersant 11 | vinyl acetate | 2.5 | x |
| Test Example 26 | ↑ | butyraldehyde | 2.5 | Δ |
| Test Example 27 | Dispersant 12 | vinylpyrrolidone | 2.5 | x |

Based on the results of Test Examples 1 to 27, it was confirmed that the dispersant of the present invention was favorable with less foaming, but when a large amount of the raw material-derived component corresponding to the component (B) was contained, foaming was significant. Particularly, as seen in Test Example 21 and Test Example 22, when the compound formed by inactivation of a polymerization initiator without polymerization was used as a dispersant, foaming was significant.

<Production of Negative Electrode Mixture Composition and Negative Electrode>

Example 2-1

According to the composition shown in Table 6, a conductive material dispersion (dispersion 1), CMC, and water were put into a plastic container with a volume of 150 $cm^3$, and the mixture was then stirred at 2,000 rpm for 30 seconds using a rotation/revolution mixer (Awatori Rentaro, ARE-310 commercially available from Thinky Corporation). Then, artificial graphite and silicon were added as a negative electrode active material, and the mixture was stirred at 2,000 rpm for 150 seconds using the rotation/revolution mixer. After that, SBR was added, and the mixture was stirred using the rotation/revolution mixer at 2,000 rpm for 30 seconds to obtain a negative electrode mixture composition. The non-volatile content of the negative electrode mixture composition was 48 mass %. In the non-volatile content of the negative electrode mixture composition, a non-volatile content ratio of artificial graphite:silicon:conductive material:CMC:SBR was 87:10:0.5:1:1.5.

The obtained negative electrode mixture composition was applied onto a copper foil having a thickness of 20 μm using an applicator, and the coating was then dried in an electric oven at 120° C.±5° C. for 25 minutes to produce an electrode film. Then, the electrode film was rolled by a roll press (3t hydraulic roll press commercially available from Thank-Metal Co., Ltd.) to obtain a negative electrode (negative electrode 1). Here, the basis weight per unit of the mixture layer was 10 $mg/cm^2$, and the density of the mixture layer after the rolling treatment was 1.6 g/cc.

Here, the above raw materials are as follows.

- artificial graphite: CGB-20 (commercially available from Nippon Graphite Industries, Co., Ltd.), a non-volatile content of 100%
- silicon: silicon monoxide (commercially available from Osaka Titanium Technologies Co., Ltd., SILICON MONOOXIDE SiO 1.3C 5 μm), a non-volatile content of 100%
- CMC: carboxymethyl cellulose #1190 (commercially available from Daicel FineChem Co., Ltd.), a non-volatile content of 100%
- SBR: styrene butadiene rubber TRD2001 (commercially available from JSR Corporation), a non-volatile content of 48%

Examples 2-2 to 2-16

Negative electrodes 2 to 16 were obtained in the same method as in Example 2-1 except that the conductive material dispersion was changed to respective dispersions (dispersions 2 to 16) shown in Table 6.

Examples 2-17 and 2-18

A negative electrode 17 and a negative electrode 18 were obtained in the same method as in Example 2-1 except that the dispersion 3 and the dispersion 14 or the dispersion 15 were mixed so that the ratio of the carbon-based conductive material was in the composition shown in Table 6 and used as a conductive material dispersion.

Comparative Examples 2-1 to 2-4

Comparative negative electrodes 1 to 4 were obtained in the same method as in Example 2-1 except that the conductive material dispersion was changed to respective dispersions (comparative dispersions 1 to 4) shown in Table 6.

(Method of Evaluating Conductivity of Negative Electrode)

The surface resistivity (Ω/□) of the mixture layer of the obtained negative electrode was measured using Loresta GP, MCP-T610 (commercially available from Mitsubishi Chemical Analytech Co., Ltd.). After the measurement, the thickness of the mixture layer was multiplied to obtain the volume resistivity (Ω·cm) of the negative electrode. The thickness of the mixture layer was obtained by subtracting the film thickness of the copper foil from the average value obtained by measuring the thickness at three points in the electrode using a film thickness meter (DIGIMICROMH-15M commercially available from Nikon Corporation) and used as the volume resistivity (Ω·cm) of the negative electrode.

<Determination Criteria>

◎: less than 0.3 Ω·cm (excellent)

○: 0.3 Ω·cm or more and less than 0.5 Ω·cm (good)

x: 0.5 Ω·cm or more (poor)

(Production of Positive Electrode Mixture Composition and Positive Electrode)

Example 3-1

According to the composition shown in Table 7, a conductive material dispersion (dispersion 1), CMC, and water were put into a plastic container with a volume of 150 $cm^3$, and the mixture was then stirred at 2,000 rpm for 30 seconds using a rotation/revolution mixer (Awatori Rentaro, ARE-310 commercially available from Thinky Corporation), and LFP was then added as a positive electrode active material, and the mixture was stirred at 2,000 rpm for 150 seconds using the rotation/revolution mixer (Awatori Rentaro, ARE-310 commercially available from Thinky Corporation). After that, PTFE was added, the mixture was stirred using the rotation/revolution mixer (Awatori Rentaro, ARE-310

TABLE 6

| | Negative electrode | Conductive material dispersion | Conductive material Type | Conductive material Non-volatile content mass % | CMC Non-volatile content mass % | SBR Non-volatile content mass % | Evaluation of conductivity |
|---|---|---|---|---|---|---|---|
| Example 2-1 | Negative electrode 1 | Dispersion 1 | BT1003M | 0.5 | 1.0 | 1.5 | ◎ |
| Example 2-2 | Negative electrode 2 | Dispersion 2 | BT1003M | 0.5 | 1.0 | 1.5 | ◎ |
| Example 2-3 | Negative electrode 3 | Dispersion 3 | BT1003M | 0.5 | 1.0 | 1.5 | ◎ |
| Example 2-4 | Negative electrode 4 | Dispersion 4 | BT1003M | 0.5 | 1.0 | 1.5 | ○ |
| Example 2-5 | Negative electrode 5 | Dispersion 5 | BT1003M | 0.5 | 1.0 | 1.5 | ○ |
| Example 2-6 | Negative electrode 6 | Dispersion 6 | BT1003M | 0.5 | 1.0 | 1.5 | ○ |
| Example 2-7 | Negative electrode 7 | Dispersion 7 | BT1003M | 0.5 | 1.0 | 1.5 | ○ |
| Example 2-8 | Negative electrode 8 | Dispersion 8 | BT1003M | 0.5 | 1.0 | 1.5 | ◎ |
| Example 2-9 | Negative electrode 9 | Dispersion 9 | BT1003M | 0.5 | 1.0 | 1.5 | ○ |
| Example 2-10 | Negative electrode 10 | Dispersion 10 | BT1003M | 0.5 | 1.0 | 1.5 | ○ |
| Example 2-11 | Negative electrode 11 | Dispersion 11 | BT1003M | 0.5 | 1.0 | 1.5 | ○ |
| Example 2-12 | Negative electrode 12 | Dispersion 12 | BT1003M | 0.5 | 1.0 | 1.5 | ○ |
| Example 2-13 | Negative electrode 13 | Dispersion 13 | 6A | 0.5 | 1.0 | 1.5 | ◎ |
| Example 2-14 | Negative electrode 14 | Dispersion 14 | TUBALL | 0.1 | 1.0 | 1.5 | ◎ |
| Example 2-15 | Negative electrode 15 | Dispersion 15 | TNSR | 0.1 | 1.0 | 1.5 | ◎ |
| Example 2-16 | Negative electrode 16 | Dispersion 16 | Li-400 | 2 | 1.0 | 1.5 | ○ |
| Example 2-17 | Negative electrode 17 | Dispersion 3/ Dispersion 14 | BT-1003M/TUBALL | 0.3/0.01 | 1.0 | 1.5 | ○ |
| Example 2-18 | Negative electrode 18 | Dispersion 3/ Dispersion 15 | BT-1003M/TNSR | 0.3/0.01 | 1.0 | 1.5 | ○ |
| Comparative Example 2-1 | Comparative negative electrode 1 | Comparative dispersion 1 | BT1003M | 0.5 | 1.0 | 1.5 | X |
| Comparative Example 2-2 | Comparative negative electrode 2 | Comparative dispersion 2 | BT1003M | 0.5 | 1.0 | 1.5 | X |
| Comparative Example 2-3 | Comparative negative electrode 3 | Comparative dispersion 3 | BT1003M | 0.5 | 1.0 | 1.5 | X |
| Comparative Example 2-4 | Comparative negative electrode 4 | Comparative dispersion 4 | BT1003M | 0.5 | 1.0 | 1.5 | X |

commercially available from Thinky Corporation) at 2,000 rpm for 30 seconds to obtain a positive electrode mixture composition. The non-volatile content of the positive electrode mixture composition was 75 mass %. In the non-volatile content of the positive electrode mixture composition, a non-volatile content ratio of LFP:conductive material:PTFE:CMC was 97:0.5:1:1.5.

The positive electrode mixture composition was applied onto an aluminum foil having a thickness of 20 μm using an applicator and then dried in an electric oven at 120° C.±5° C. for 25 minutes to produce an electrode film. Then, the electrode film was rolled by a roll press (3t hydraulic roll press commercially available from Thank-Metal Co., Ltd.) to obtain a positive electrode (positive electrode 1). Here, the basis weight per unit of the mixture layer was 20 mg/cm$^2$, and the density of the mixture layer after the rolling treatment was 2.1 g/cc.

Here, raw materials shown in Table 7 are as follows.

LFP: lithium iron phosphate HED (trademark) LFP-400 (commercially available from BASF, a non-volatile content of 100%)

PTFE: polytetrafluoroethylene POLYFLON PTFE D-210C (commercially available from Daikin Industries, Ltd., a non-volatile content of 60%)

CMC: carboxymethyl cellulose #1190 (commercially available from Daicel FineChem Co., Ltd., a non-volatile content of 100%)

Examples 3-2 to 3-16

Positive electrodes 2 to 16 were obtained in the same method as in Example 3-1 except that the conductive material dispersion was changed to respective dispersions (dispersions 2 to 16) shown in Table 7.

Examples 3-17 and 3-18

A positive electrode 17 and a positive electrode 18 were obtained in the same method as in Example 3-1 except that the dispersion 3 and the dispersion 14 or the dispersion 15 were mixed so that the ratio of the carbon-based conductive material was in the composition shown in Table 7 and used as a conductive material dispersion.

Comparative Examples 3-1 to 3-4

Comparative positive electrodes 1 to 4 were obtained in the same method as in Example 3-1 except that the conductive material dispersion was changed to respective dispersions (comparative dispersions 1 to 4) shown in Table 7.

(Method of Evaluating Conductivity of Positive Electrode)

The conductivity was evaluated in the same method as in the negative electrode except that the obtained positive electrode was made of an aluminum foil in place of a copper foil.

<Determination Criteria>

◎: less than 10 Ω·cm (excellent)

O: 10 Ω·cm or more and less than 20 Ω·cm (good)

x: 20 Ω·cm or more (poor)

TABLE 7

| | | | Conductive material | | CMC | SBR | |
|---|---|---|---|---|---|---|---|
| | Positive electrode | Conductive material dispersion | Type | Non-volatile content mass % | Non-volatile content mass % | Non-volatile content mass % | Evaluation of conductivity |
| Example 3-1 | Positive electrode 1 | Dispersion 1 | BT1003M | 0.5 | 1.0 | 1.5 | ○ |
| Example 3-2 | Positive electrode 2 | Dispersion 2 | BT1003M | 0.5 | 1.0 | 1.5 | ○ |
| Example 3-3 | Positive electrode 3 | Dispersion 3 | BT1003M | 0.5 | 1.0 | 1.5 | ○ |
| Example 3-4 | Positive electrode 4 | Dispersion 4 | BT1003M | 0.5 | 1.0 | 1.5 | ○ |
| Example 3-5 | Positive electrode 5 | Dispersion 5 | BT1003M | 0.5 | 1.0 | 1.5 | ○ |
| Example 3-6 | Positive electrode 6 | Dispersion 6 | BT1003M | 0.5 | 1.0 | 1.5 | ○ |
| Example 3-7 | Positive electrode 7 | Dispersion 7 | BT1003M | 0.5 | 1.0 | 1.5 | ○ |
| Example 3-8 | Positive electrode 8 | Dispersion 8 | BT1003M | 0.5 | 1.0 | 1.5 | ○ |
| Example 3-9 | Positive electrode 9 | Dispersion 9 | BT1003M | 0.5 | 1.0 | 1.5 | ○ |
| Example 3-10 | Positive electrode 10 | Dispersion 10 | BT1003M | 0.5 | 1.0 | 1.5 | ○ |
| Example 3-11 | Positive electrode 11 | Dispersion 11 | BT1003M | 0.5 | 1.0 | 1.5 | ○ |
| Example 3-12 | Positive electrode 12 | Dispersion 12 | BT1003M | 0.5 | 1.0 | 1.5 | ○ |
| Example 3-13 | Positive electrode 13 | Dispersion 13 | 6A | 0.5 | 1.0 | 1.5 | ◎ |
| Example 3-14 | Positive electrode 14 | Dispersion 14 | TUBALL | 0.1 | | 1.5 | ○ |
| Example 3-15 | Positive electrode 15 | Dispersion 15 | TNSR | 0.1 | 1.0 | 1.5 | ◎ |
| Example 3-16 | Positive electrode 16 | Dispersion 16 | Li-400 | 2 | 1.0 | 1.5 | ○ |
| Example 3-17 | Positive electrode 17 | Dispersion 3/ Dispersion 14 | BT-1003M/TUBALL | 0.3/0.01 | 1.0 | 1.5 | ○ |
| Example 3-18 | Positive electrode 18 | Dispersion 3/ Dispersion 15 | BT-1003M/TNSR | 0.3/0.01 | 1.0 | 1.5 | ○ |

TABLE 7-continued

| | Positive electrode | Conductive material dispersion | Conductive material Type | Conductive material Non-volatile content mass % | CMC Non-volatile content mass % | SBR Non-volatile content mass % | Evaluation of conductivity |
|---|---|---|---|---|---|---|---|
| Comparative Example 3-1 | Comparative positive electrode 1 | Comparative dispersion 1 | BT1003M | 0.5 | 1.0 | 1.5 | X |
| Comparative Example 3-2 | Comparative positive electrode 2 | Comparative dispersion 2 | BT1003M | 0.5 | 1.0 | 1.5 | X |
| Comparative Example 3-3 | Comparative positive electrode 3 | Comparative dispersion 3 | BT1003M | 0.5 | 1.0 | 1.5 | X |
| Comparative Example 3-4 | Comparative positive electrode 4 | Comparative dispersion 4 | BT1003M | 0.5 | 1.0 | 1.5 | X |

(Production of Standard Positive Electrode)

92 mass % of LFP (HED (trademark) LFP-400, commercially available from BASF, a non-volatile content of 100%) as a positive electrode active material, 4 mass % of acetylene black (Denka Black (registered trademark) HS-100, commercially available from Denka Co., Ltd., a non-volatile content of 100%), and 1.6 mass % of CMC (#1190, commercially available from Daicel FineChem Co., Ltd., a non-volatile content of 100%) were put into a plastic container with a volume of 150 ml, and then mixed using a spatula until the powder was uniform. Then, 20.5 mass % of water was added, and the mixture was stirred at 2,000 rpm for 30 seconds using the rotation/revolution mixer (Awatori Rentaro, ARE-310 commercially available from Thinky Corporation). Then, the mixture in the plastic container was mixed using a spatula until it became uniform, 4 mass % of PTFE (commercially available from Daikin Industries, Ltd., a non-volatile content of 60%) was added, and the mixture was stirred at 2,000 rpm for 30 seconds using the rotation/revolution mixer. After that, 11.2 mass % of water was added, and the mixture was stirred at 2,000 rpm for 30 seconds using the rotation/revolution mixer. Finally, the mixture was stirred at 3,000 rpm for 10 minutes using a high-speed stirrer to obtain a standard positive electrode mixture composition.

The above standard positive electrode mixture composition was applied onto an aluminum foil having a thickness of 20 μm as a collector using an applicator. Next, the sample was dried in an electric oven at 120° C.±5° C. for 25 minutes and the basis weight per unit area of the electrode was adjusted to 20 mg/cm$^2$. In addition, a rolling treatment was performed by a roll press (3t hydraulic roll press commercially available from Thank-Metal Co., Ltd.) to produce a standard positive electrode in which the density of the mixture layer was 2.1 g/cm$^3$.

(Production of Standard Negative Electrode)

0.5 mass % of acetylene black (Denka Black (registered trademark) HS-100, commercially available from Denka Co., Ltd.), 1 mass % of CMC (#1190, commercially available from Daicel FineChem Co., Ltd., a non-volatile content of 100%), and 98.4 mass % of water were put into a plastic container with a volume of 150 ml, and the mixture was then stirred at 2,000 rpm for 30 seconds using the rotation/revolution mixer (Awatori Rentaro, ARE-310 commercially available from Thinky Corporation). In addition, 87 mass % of artificial graphite (CGB-20, commercially available from Nippon Graphite Industries, Co., Ltd., a non-volatile content of 100%) as an active material and 10 mass % of silicon (silicon monoxide, commercially available from Osaka Titanium Technologies Co., Ltd., SILICON MONOOXIDE SiO 1.3C 5 μm, a non-volatile content of 100%) were added and the mixture was stirred at 2,000 rpm for 150 seconds using the rotation/revolution mixer (Awatori Rentaro, ARE-310 commercially available from Thinky Corporation). Subsequently, 3.1 mass % of SBR (TRD2001, commercially available from JSR Corporation) was added, and the mixture was stirred at 2,000 rpm for 30 seconds using the rotation/revolution mixer (Awatori Rentaro, ARE-310 commercially available from Thinky Corporation) to obtain a standard negative electrode mixture composition. The non-volatile content of the standard negative electrode mixture composition was 50 mass %.

The above standard negative electrode mixture composition was applied onto a copper foil having a thickness of 20 μm as a collector using an applicator and then dried in an electric oven at 80° C.±5° C. for 25 minutes and the basis weight per unit area of the electrode was adjusted to 10 mg/cm$^2$. In addition, a rolling treatment was performed by a roll press (3t hydraulic roll press commercially available from Thank-Metal Co., Ltd.) to produce a standard negative electrode in which the density of the mixture layer was 1.6 g/cm$^3$.

Examples 4-1 to 4-18 and Comparative Examples 4-1 to 4-4

Examples 5-1 to 5-18 and Comparative Examples 5-1 to 5-4

(Production of Secondary Battery)

The negative electrodes and positive electrodes shown in Table 8 and Table 9 that were cut into 50 mm×45 mm, and 45 mm×40 mm, and a separator (porous polypropylene film) inserted therebetween were inserted into an aluminum laminate bag, and drying was performed in an electric oven at 70° C. for 1 hour. Then, in a glove box filled with argon gas, 2 mL of an electrolytic solution (a non-aqueous electrolytic solution obtained by preparing a mixed solvent in which ethylene carbonate, dimethyl carbonate and diethyl carbonate were mixed at a volume ratio of 1:1:1, additionally adding 1 mass % of vinylene carbonate as an additive with respect to 100 mass % and then dissolving $LiPF_6$ at a concentration of 1 M) was injected and the aluminum laminate bag was then sealed to produce negative electrode evaluation batteries 1 to 18, negative electrode evaluation comparative batteries 1 to 4, positive electrode evaluation batteries 1 to 18, and positive electrode evaluation comparative batteries 1 to 4.

TABLE 8

| | Battery | Negative electrode | Positive electrode | Rate property | Cycle property | Low temperature property |
|---|---|---|---|---|---|---|
| Example 4-1 | Negative electrode evaluation battery 1 | Negative electrode 1 | Standard positive electrode | ◎ | ○ | ○ |
| Example 4-2 | Negative electrode evaluation battery 2 | Negative electrode 2 | Standard positive electrode | ◎ | ○ | ◎ |
| Example 4-3 | Negative electrode evaluation battery 3 | Negative electrode 3 | Standard positive electrode | ◎ | ○ | ○ |
| Example 4-4 | Negative electrode evaluation battery 4 | Negative electrode 4 | Standard positive electrode | ○ | ○ | ○ |
| Example 4-5 | Negative electrode evaluation battery 5 | Negative electrode 5 | Standard positive electrode | ○ | ○ | ○ |
| Example 4-6 | Negative electrode evaluation battery 6 | Negative electrode 6 | Standard positive electrode | ◎ | ○ | ◎ |
| Example 4-7 | Negative electrode evaluation battery 7 | Negative electrode 7 | Standard positive electrode | ○ | ○ | ○ |
| Example 4-8 | Negative electrode evaluation battery 8 | Negative electrode 8 | Standard positive electrode | ○ | ○ | ○ |
| Example 4-9 | Negative electrode evaluation battery 9 | Negative electrode 9 | Standard positive electrode | ○ | ○ | ○ |
| Example 4-10 | Negative electrode evaluation battery 10 | Negative electrode 10 | Standard positive electrode | ○ | ○ | ○ |
| Example 4-11 | Negative electrode evaluation battery 11 | Negative electrode 11 | Standard positive electrode | ○ | ○ | ○ |
| Example 4-12 | Negative electrode evaluation battery 12 | Negative electrode 12 | Standard positive electrode | ○ | ○ | ○ |
| Example 4-13 | Negative electrode evaluation battery 13 | Negative electrode 13 | Standard positive electrode | ◎ | ○ | ○ |
| Example 4-14 | Negative electrode evaluation battery 14 | Negative electrode 14 | Standard positive electrode | ○ | ◎ | ◎ |
| Example 4-15 | Negative electrode evaluation battery 15 | Negative electrode 15 | Standard positive electrode | ○ | ◎ | ◎ |
| Example 4-16 | Negative electrode evaluation battery 16 | Negative electrode 16 | Standard positive electrode | ○ | ○ | ○ |
| Example 4-17 | Negative electrode evaluation battery 17 | Negative electrode 17 | Standard positive electrode | ◎ | ◎ | ◎ |
| Example 4-18 | Negative electrode evaluation battery 18 | Negative electrode 18 | Standard positive electrode | ◎ | ◎ | ◎ |
| Comparative Example 4-1 | Negative electrode evaluation comparative battery 1 | Comparative negative electrode 1 | Standard positive electrode | X | X | X |
| Comparative Example 4-2 | Negative electrode evaluation comparative battery 2 | Comparative negative electrode 2 | Standard positive electrode | X | X | X |
| Comparative Example 4-3 | Negative electrode evaluation comparative battery 3 | Comparative negative electrode 3 | Standard positive electrode | X | X | X |
| Comparative Example 4-4 | Negative electrode evaluation comparative battery 4 | Comparative negative electrode 4 | Standard positive electrode | X | X | X |

TABLE 9

| | Battery | Negative electrode | Positive electrode | Rate property | Cycle property | Low temperature property |
|---|---|---|---|---|---|---|
| Example 5-1 | Positive electrode evaluation battery 1 | Standard negative electrode | Positive electrode 1 | ◎ | ○ | ○ |
| Example 5-2 | Positive electrode evaluation battery 2 | Standard negative electrode | Positive electrode 2 | ◎ | ◎ | ◎ |
| Example 5-3 | Positive electrode evaluation battery 3 | Standard negative electrode | Positive electrode 3 | ◎ | ◎ | ◎ |
| Example 5-4 | Positive electrode evaluation battery 4 | Standard negative electrode | Positive electrode 4 | ◎ | ○ | ◎ |
| Example 5-5 | Positive electrode evaluation battery 5 | Standard negative electrode | Positive electrode 5 | ◎ | ○ | ○ |
| Example 5-6 | Positive electrode evaluation battery 6 | Standard negative electrode | Positive electrode 6 | ◎ | ◎ | ◎ |
| Example 5-7 | Positive electrode evaluation battery 7 | Standard negative electrode | Positive electrode 7 | ◎ | ○ | ○ |
| Example 5-8 | Positive electrode evaluation battery 8 | Standard negative electrode | Positive electrode 8 | ◎ | ○ | ○ |
| Example 5-9 | Positive electrode evaluation battery 9 | Standard negative electrode | Positive electrode 9 | ◎ | ○ | ○ |
| Example 5-10 | Positive electrode evaluation battery 10 | Standard negative electrode | Positive electrode 10 | ◎ | ○ | ○ |
| Example 5-11 | Positive electrode evaluation battery 11 | Standard negative electrode | Positive electrode 11 | ◎ | ○ | ○ |
| Example 5-12 | Positive electrode evaluation battery 12 | Standard negative electrode | Positive electrode 12 | ◎ | ○ | ○ |
| Example 5-13 | Positive electrode evaluation battery 13 | Standard negative electrode | Positive electrode 13 | ◎ | ○ | ◎ |
| Example 5-14 | Positive electrode evaluation battery 14 | Standard negative electrode | Positive electrode 14 | ◎ | ◎ | ○ |
| Example 5-15 | Positive electrode evaluation battery 15 | Standard negative electrode | Positive electrode 15 | ◎ | ◎ | ◎ |
| Example 5-16 | Positive electrode evaluation battery 16 | Standard negative electrode | Positive electrode 16 | ○ | ○ | ○ |
| Example 5-17 | Positive electrode evaluation battery 17 | Standard negative electrode | Positive electrode 17 | ◎ | ◎ | ◎ |
| Example 5-18 | Positive electrode evaluation battery 18 | Standard negative electrode | Positive electrode 18 | ◎ | ◎ | ◎ |
| Comparative Example 5-1 | Positive electrode evaluation comparative battery 1 | Standard negative electrode | Comparative positive electrode 1 | X | X | X |
| Comparative Example 5-2 | Positive electrode evaluation comparative battery 2 | Standard negative electrode | Comparative positive electrode 2 | ○ | X | X |
| Comparative Example 5-3 | Positive electrode evaluation comparative battery 3 | Standard negative electrode | Comparative positive electrode 3 | X | X | X |
| Comparative Example 5-4 | Positive electrode evaluation comparative battery 4 | Standard negative electrode | Comparative positive electrode 4 | ○ | X | X |

(Method of Evaluating Rate Property of Secondary Battery)

The obtained negative electrode evaluation secondary battery and positive electrode evaluation secondary battery were put into a thermostatic chamber at 25° C. and charging and discharging measurement was performed using a charging and discharging device (SM-8 commercially available from Hokuto Denko Corporation). After constant voltage and constant current charging (a cutoff current of 1 mA (0.02C)) was performed at a charging current of 10 mA (0.2C) and an end-of-charge voltage of 4.3 V, constant current discharging was performed at a discharging current of 10 mA (0.2C) and an end-of-discharge voltage of 3 V. After this operation was repeated three times, constant voltage and constant current charging (cutoff current (1 mA0.02C)) was performed at a charging current of 10 mA (0.2C) and an end-of-charge voltage of 4.3 V, and constant current discharging was performed at a discharging current of 0.2C and 3C until the end-of-discharge voltage reached 3.0 V, and respective discharging capacities were obtained. The rate property can be represented by the ratio of the 0.2C discharging capacity and the 3C discharging capacity according to the following Formula 1.

rate property=3C discharging capacity/3rd 0.2C discharging capacity×100(%) (Formula 1)

<Determination Criteria>

◎: 80% or more (excellent)

○: 60% or more and less than 80% (good)

x: less than 60% (poor)

(Method of Evaluating Cycle Property of Secondary Battery)

The obtained negative electrode evaluation secondary battery and positive electrode evaluation secondary battery were put into a thermostatic chamber at 25° C. and charging and discharging measurement was performed using a charging and discharging device (SM-8 commercially available from Hokuto Denko Corporation). After constant voltage and constant current charging (a cutoff current of 2.5 mA (0.05C)) was performed at a charging current of 25 mA (0.5C) and an end-of-charge voltage of 4.3 V, constant current discharging was performed at a discharging current of 25 mA (0.5C) and an end-of-discharge voltage of 3 V. This operation was repeated 200 times. The cycle property can be represented by the ratio of the 3rd 0.5C discharging capacity and the 200th 0.5C discharging capacity at 25° C. according to the following Formula 2.

cycle property=200th 0.5C discharging capacity/3rd 0.5° C. discharging capacity×100(%) (Formula 2)

<Determination Criteria>

◎: 85% or more (excellent)

○: 80% or more and less than 85% (good)

x: less than 80% (poor)

(Low Temperature Property of Secondary Battery)

The obtained negative electrode evaluation secondary battery and positive electrode evaluation secondary battery were put into a thermostatic chamber at 25° C. and charging and discharging measurement was performed using a charging and discharging device (SM-8 commercially available from Hokuto Denko Corporation). After constant voltage and constant current charging (a cutoff current of 2.5 mA (0.05C)) was performed at a charging current of 25 mA (0.5C) and an end-of-charge voltage of 4.3 V, constant current discharging was performed at a discharging current of 25 mA (0.5C) and an end-of-discharge voltage of 3 V. After this operation was repeated 10 times, constant voltage and constant current charging (a cutoff current of 2.5 mA (0.05C)) was performed at a charging current of 25 mA (0.5C) and an end-of-charge voltage of 4.3 V. Then, the negative electrode evaluation secondary battery and the positive electrode evaluation secondary battery were put into a thermostatic chamber at −10° C. for 1 hour and constant current discharging was performed at a discharging current of 100 mA (2.0C) and an end-of-discharge voltage of 3 V. The low temperature property can be represented by the ratio of the 10th 0.5C discharging capacity and the $11^{th}$ 2.0C discharging capacity at 25° C. according to the following Formula 3.

low temperature property=2.0C discharging capacity/$10^{th}$ 0.5C discharging capacity×100(%) (Formula 3)

<Determination Criteria>

◎: 80% or more (excellent)

○: 60% or more and less than 80% (good)

x: less than 60% (poor)

The invention claimed is:

1. A conductive material dispersion comprising a dispersant that includes the following (1) and (2), a carbon-based conductive material (C), and a medium containing at least water (D):

(1) a polymer (A) containing one or more selected from the group consisting of nitrile group-containing structural units, carboxyl group-containing structural units, hydroxyl group-containing structural units, and heterocycle-containing structural units and having a weight average molecular weight of 5,000 or more and 360,000 or less, and (2) a component (B) other than a polymer and derived from a raw material of the polymer (A), and a content of the component (B) based on a total mass of the dispersant being 1.9 mass % or less, wherein the component (B) contains one or more selected from the group consisting of unreacted raw materials and by-products generated in a polymerization reaction or a modification reaction of the polymer (A), wherein the carbon-based conductive material (C) includes carbon nanotubes having an average fiber length of 0.3 μm or more.

2. The conductive material dispersion according to claim 1, wherein the polymer (A) includes 5 mass % or less of a polymer (E) having a molecular weight of less than 1,000 based on the total mass of the polymer (A).

3. The conductive material dispersion according to claim 1, wherein a complex elastic modulus at 25° C. and 1 Hz obtained by dynamic viscoelasticity measurement is 5 Pa or more and less than 650 Pa.

4. The conductive material dispersion according to claim 1, wherein a phase angle at 25° C. and 1 Hz obtained by dynamic viscoelasticity measurement is 3° or more and less than 60°.

5. The conductive material dispersion according to claim 1, further comprising a binder.

6. The conductive material dispersion according to claim 1, further comprising an electrode active material.

7. A coating formed using the conductive material dispersion according to claim 1.

8. A secondary battery comprising the coating according to claim 7.

* * * * *